(12) United States Patent
Costes

(10) Patent No.: US 6,231,005 B1
(45) Date of Patent: May 15, 2001

(54) DEVICE FOR THE INDIVIDUAL CONTROL OF THE ROTOR BLADES OF THE ROTARY WING STRUCTURES OF AIRCRAFT WITH MULTIPLE SWASHPLATES

(75) Inventor: Jean-Joël Costes, Antony (FR)

(73) Assignee: Onera (Office National d'Etudes et de Recherches Aerospatials), Chatillon (FR)

( * ) Notice: Subject to any disclaimer, the term of this patent is extended or adjusted under 35 U.S.C. 154(b) by 0 days.

(21) Appl. No.: 09/055,997

(22) Filed: Apr. 7, 1998

(30) Foreign Application Priority Data

Mar. 16, 1998 (FR) .................................................. 97 04279

(51) Int. Cl.[7] ................................................. B64C 27/605
(52) U.S. Cl. ................................... 244/17.25; 244/17.27; 416/747; 416/115
(58) Field of Search ............................. 244/17.25, 17.27, 244/17.11, 39; 416/147, 148, 134 A, 115, 116

(56) References Cited

U.S. PATENT DOCUMENTS

| | | | |
|---|---|---|---|
| 1,828,783 | * | 10/1931 | Oehmichen . |
| 2,481,745 | * | 9/1949 | Hiller . |
| 2,601,090 | * | 6/1952 | Burwell . |
| 2,629,567 | * | 2/1953 | Papadakos . |
| 2,648,387 | * | 8/1953 | Doman . |
| 2,980,187 | | 4/1961 | Smyth-Davila . |
| 3,012,614 | * | 12/1961 | Smyth-Davila . |
| 3,159,360 | * | 12/1964 | Ryan et al. . |
| 3,448,810 | | 6/1969 | Vogt . |
| 3,504,989 | | 4/1970 | Kisovec . |
| 5,562,415 | * | 10/1996 | Legendre et al. ................ 416/114 |
| 5,599,167 | | 2/1997 | Daldosso . |
| 5,624,232 | | 4/1997 | Certain . |
| 6,032,899 | * | 3/2000 | Mondet et al. .................. 244/17.25 |

FOREIGN PATENT DOCUMENTS 451 218   10/1991   (EP) .

* cited by examiner

Primary Examiner—Peter M. Poon
Assistant Examiner—Treu Dinh
(74) Attorney, Agent, or Firm—Larson & Taylor PLC

(57) ABSTRACT

The device for the individual control of the blades includes at least two sets of rotating swashplates centered on the rotor axis and non-rotating swashplates at least inclinable in all directions under the action of at least two actuators inserted between the first set and a non-rotating structure, and under the action of at least one other actuator inserted between this structure and the second set. Each non-rotating plate is held by a connecting piece to the non-rotating structure, and each rotating plate is rotated with the rotor and connected to at least one blade respectively of the rotor via a respective pitch rod. The device also includes at least as many actuators as the rotor has blades, and all the actuators are non-rotating.

20 Claims, 15 Drawing Sheets

Figure 1:
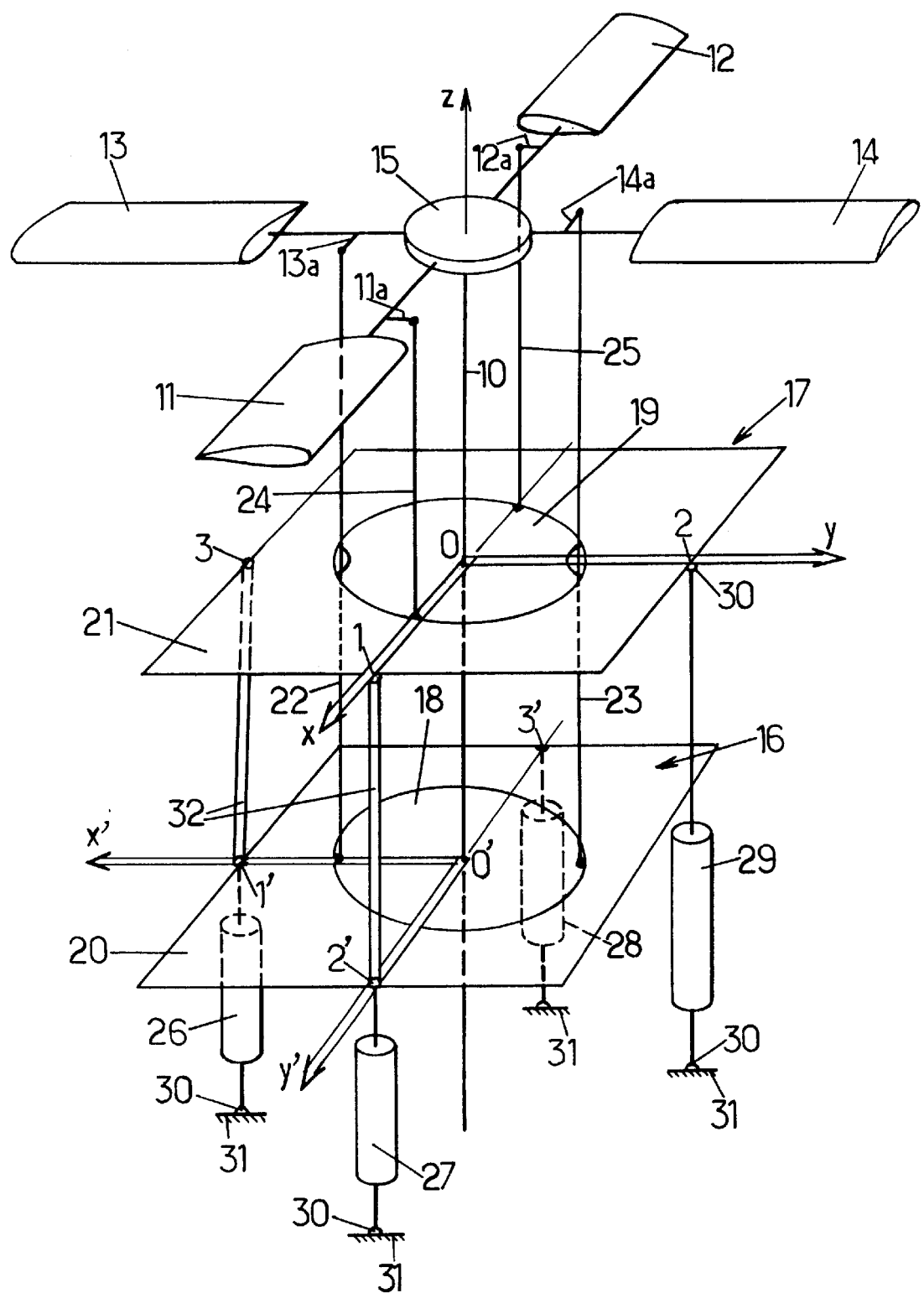

DEVICE FOR THE INDIVIDUAL CONTROL OF THE ROTOR BLADES OF THE ROTARY WING STRUCTURES OF AIRCRAFT WITH MULTIPLE SWASHPLATES

The invention relates to a device for the individual control of the blades of a rotor with at least four blades for the rotary wing structure of an aircraft, particularly a helicopter main rotor.

Although the individual blade-control device according to the invention is not restricted, in its application, to helicopter main rotors, the invention is described hereinbelow in the context of this specific application, for which the invention seems to present the greatest benefit.

The pitch of the blades of a helicopter main rotor is conventionally controlled by a swashplate device comprising a set of two swashplates surrounding the rotor mast. One is a rotating plate, rotated with the rotor about the axis of rotation of the latter. This plate, connected to each of the blades of the rotor by a pitch rod, can rotate on the other plate, which is non-rotating because it is held by anti-rotation means attaching it to the stationary structure of the aircraft. The set of two plates can be translated along the axis of rotation of the rotor, to transmit a collective pitch to the blades, and can be inclined in any direction to transmit to the blades a cyclic pitch which varies according to a sinusoidal law (fundamental or 1st order) as the rotor rotates, under the action of three operating actuators each articulated to the non-rotating plate and to the stationary structure of the aircraft.

In a device of this kind, the operating actuators are control means generally comprising rams which operate quasistatistically.

In order to improve rotor performance, particularly from the energy point of view, it has been proposed that harmonics (2nd and higher order) be introduced into the law governing the variation in angle of incidence of the blades.

This has been achieved by giving the set of swashplates a "height" (translational movement parallel to the axis of the rotor) and an inclination which can be varied over time, but which are predetermined, using non-rotating hydraulic rams that can be computer-controlled and afford a multicyclic control.

It has also been proposed for such a multicyclic control system to be improved using sensors arranged on the blades for measuring their movements and/or the aerodynamic forces to which they are being subjected and for delivering signals allowing the angle of incidence of each blade to be controlled automatically independently of the others, and in a closed loop, thus getting around the idea of harmonics of the rotor rotational frequency.

Such individual control of blades must make it possible to obtain any arbitrary variation in the angle of incidence of each of the blades, which are considered as being independent of one another, because they may encounter random aerodynamic disturbances which vary from one blade to another.

To achieve individual control of the pitch of each blade, making it possible to improve rotor efficiency, and reduce vibration and noise, it is necessary to give each blade, within a reference frame which rotates with the rotor, any variable angle of incidence, and this requires active control means capable of operating according to more complex laws which take harmonics into account.

It is known that such individual control of each blade of a two-bladed or three-bladed rotor is possible using a conventional swashplates device controlled by three rams mounted in a stationary reference frame associated with the body of the aircraft, and in which the swashplates which have three degrees of freedom can control up to three blades and give them any three pitch movements whatsoever independently of each other under the effect of complex control of the rams, taking the azimuth position of the blades into account.

It has been proposed that this type of individual blade control be generalized to cover rotors which have more than three blades, using hydraulic rams mounted in a reference frame which rotates with the rotor, there being as many of these as there are blades, each of them respectively controlling the pitch of one blade.

However, this development, with rams located in a rotating reference frame, is difficult to optimize and expensive in terms of maintenance, especially as far as the rotating hydraulic seals needed for supplying the hydraulic rams from the helicopter hydraulic circuits are concerned.

EP-A-0,451,218 discloses a system for the individual control of the pitch of the blades of a helicopter four-bladed lift rotor. It comprises a conventional swashplates device, as outlined hereinabove, with two of the four pitch-control rods driven by the rotating plate and which are each connected to a respective one of two pitch rods of two diametrically opposed plates via respective one of two levers pivoting on the rotor mast.

The other two pitch control rods, driven by the rotating plate, are each connected to a respective one of the two pitch rods of the other two diametrically opposed blades by a respective one of two other levers pivoting on a rotary differential sleeve rotated by the rotor mast and translatable parallel to the axis of the rotor by a fourth actuator servo controlled using signals from blade-mounted sensors.

This known individual blade control therefore consists in adding, for two diametrically opposed blades, a pitch of the collective type, provided by the rotary sleeve with controlled axial sliding, to the conventional collective and cyclic pitch transmitted to the four blades by a conventional swashplates device.

In this system, the rotary and translatable sleeve introduces just one additional degree of freedom, even if it controls two blades. This means that for a rotor with more than three blades, it is necessary to introduce as many rotary and sliding concentric sleeves as there are blades in excess of three, and the study into the individual control of the blades needs to be entirely reworked.

The principle employed by this known system is of acting differentially on one or more blades, in particular on two diametrically opposed blades for reasons of symmetry. However, there is no decoupling between the blades, because the conventional set of swashplates acts on the four blades whereas the differential sleeve acts on two of them.

The system described in EP-A-0,451,218 is a system with full authority for which, in the event of a breakdown in the individual control, there is not explicitly provided any system that will allow operation in control mode with reduced authority, especially since in normal operation, the three rams that operate the conventional swashplates in addition to providing the monocyclic function, fulfil the function of individual control, without there being any decoupling between these two functions.

The problem underlying the invention is that of remedying the drawbacks of the known systems for individually controlling the blades with rotary actuators or according to EP-A-0,451,218, and of proposing a device for the individual control of the blades for a rotor with at least four blades, using operating actuators which are situated in the stationary reference frame, using reliable and well-known technology, there being at least as many of these actuators as there are blades to be controlled.

Another object of the invention is to propose a device for the individual control of the blades which, from a control configuration which, in normal operation, has full authority, can adopt a control configuration with reduced authority, applying a conventional monocyclic control law in the event of a breakdown in the individual control device. This device can be readily applied to devices for the individual control of blades for two-bladed or three-bladed rotors.

Finally, another object of the invention is to propose such an individual control device of this kind, which allows complete decoupling between groups of blades, so that vibration can be controlled, it only being possible for significant vibration of one blade, which may have been damaged by a projectile, to be transmitted to the group of blades to which this blade belongs, which means that it will be easier for these vibrations to be compensated by using the individual control.

The idea underlying the invention is that of using several sets of swashplates, that is to say at least two sets of swashplates similar to the conventional swashplates devices, each of which can at least be inclined in all directions about a centre situated on the axis of the rotor and, in some alternative forms, also be translated along this axis. Thus, each set of swashplates can control up to three blades independently, so that for a five-bladed or six-bladed rotor, the mechanics involved are not fundamentally any more complicated than they are for a four-bladed rotor, this advantage being particularly appreciable when developing various versions of the same helicopter, in which the main rotor may change from a four-bladed rotor to a five-bladed rotor, for example. This is because an individual blade control device with two sets of swashplates allows pitch control on four-bladed, five-bladed or six-bladed rotors.

More specifically, the invention proposes a device for the individual control of the blades of a rotor with at least four blades for the rotary wing structure of an aircraft of the type comprising a first set of swashplates, a set of swashplates comprising a rotating plate having a centre of rotation on the axis of rotation of the rotor and rotating on a non-rotating plate having a centre of pivoting on the axis of the rotor coincident with the centre of rotation of the rotating plate and defining the centre of a set of swashplates, said first set being inclinable in all directions about its centre under the action of at least two operating actuators inserted between a non-rotating structure of the aircraft and set first set, each being articulated to the non-rotating plate, held by connecting means to said non-rotating structure, while the rotating plate is rotated by means of connection to the rotor about the axis of the rotor, and is connected to each of at least two blades of the rotor by a respective pitch rod, the device comprising at least as many operating actuators as the rotor has blades, and all the actuators being non-rotating, and which is characterised in that it comprises at least a second set of swashplates, the centre of which also lies on the axis of the rotor, and said second set being inclinable in all directions about its centre under the action of at least one other operating actuator inserted between a non-rotating structure and said second set, the non-rotating plate of which is articulated to said other actuator and is held by connecting means to a non-rotating structure, while the rotating plate of said second set is also rotated by means of connection to the rotor, about the axis of the latter, and is connected to each of at least one other blade of the rotor by a respective pitch rod.

A non-rotating structure may be a stationary structure, such as the helicopter cell, or a non-rotating plate, for example that of another set of swashplates.

A rotor according to the invention, but which has not been optimized, with four, five or six blades, comprises, for example, a first inclinable set of swashplates, the centre of which can be translated, under the action of three actuators and connected to three first blades by three pitch rods, and a second inclinable set of swashplates, the centre of which can be translated, under the action of three other actuators and connected to one, two or three last blades by one, two or three pitch rods respectively.

A rotor according to the invention, but which is not optimized, with seven, eight or nine blades, comprises a third set of swashplates, identical to the first set.

Beyond these examples, there are numerous alternative forms some of which, the optimized ones, have the attraction of employing a minimum number of actuators.

In a first optimized alternative form, for a four-bladed rotor, in which the blades are grouped in two pairs of blades which are diametrically opposed with respect to the axis of the rotor, the device is such that the pitch rods of two diametrically opposed blades are articulated to the rotating plate of the first set of swashplates, the centre of which can be translated along the axis of the rotor, and the non-rotating plate of which is articulated to three operating actuators, controlling the translations and inclinations of said first set of swashplates, the pitch rods of the other two diametrically opposed blades being articulated to the rotating plate of the second set of swashplates, the centre of which is axially offset with respect to that of the first set of swashplates, and can be translated along the axis of the rotor, and the non-rotating plate of which is articulated to a fourth operating actuator and connected to the non-rotating plate of the first set of swashplates by two rigid bars of constant length, each transmitting to the non-rotating plate of said second set, the movement transmitted to the non-rotating plate of said first set by each one respectively of two actuators articulated to the latter plate.

In this alternative form, it is further advantageous for the two rigid bars connecting the two non-rotating plates together, to constitute connecting means which oppose the rotation of the non-rotating plate of the second set of swashplates, it being possible for the non-rotating plate of the first set to be held by conventional anti-rotation means, such as a non-rotating scissors.

According to a second optimized alternative form of four-bladed rotor, two pitch rods of two nondiametrically opposed blades are articulated respectively to the rotating plate of each of two sets of swashplates, while the non-rotating plate of each of the two sets of swashplates is articulated to two respective nondiametrically opposed operating actuators controlling only the inclinations of the corresponding non-rotating plate about the corresponding centre of pivoting, the centres of the two sets of swashplates not being translated along the axis with respect to the non-rotating structure where the actuators are articulated. The centres of the two sets of swashplates may be coincident in this second alternative form.

In general, to optimize a rotor with at least four blades, the invention proposes three embodiments which differ according to whether the number of blades is a multiple of three, or a multiple of three increased by two, or alternatively a multiple of three, increased by one.

If the number b of blades is a multiple 3 n of 3, n being a whole number greater than or equal to 2, the device advantageously comprises a number n of sets of swashplates, each centre of which can be translated along the axis of the rotor, and the rotating plate of each of which is articulated to three respective pitch rods for the blades, and the non-rotating plate of each of which is articulated to and moved by three respective operating actuators. This solution consists in combining several conventional swashplates devices, each of which controls three blades which can be grouped together in any way possible, so that the choice can be governed by the dictates of space and/or symmetry of the device.

For a rotor in which the number b of blades is equal to 3 n+2, where n is a whole number greater than or equal to 1, the device comprises a number n of sets of swashplates, each centre of which can be translated along the axis of the rotor, and the rotating plate of each of which is articulated to three respective pitch rods for the blades, and the non-rotating plate of each of which is articulated to and moved by three respective operating actuators, and another set of swashplates, the rotating plate of which is articulated to two respective pitch rods for two nondiametrically opposed blades, and the non-rotating plate of which is articulated to two respective nondiametrically opposed operating actuators controlling only the inclinations of said other set about the corresponding centre of pivoting.

It is always possible for this type of rotor for the blades controlled by the n identical sets of swashplates to be distributed in such a way that the last pair of blades, controlled by the other set of swashplates, does not consist of two diametrically opposed blades.

Thus, for a five-bladed rotor, the device comprises two sets of swashplates, one of them, identical to the one conventionally used in a three-bladed rotor, controlling three blades of the rotor, and the second set, of the so-called fixed-centre type, controlling the remaining two blades under the action of two actuators positioning the two plates of this second set independently of the positioning of the two plates of the first set under the action of its three operating actuators.

Finally, for a rotor in which the number b of blades is equal to 3 n+1, where n is a whole number greater than or equal to 1, the device comprises a number (n−1) of sets of swashplates, each centre of which can be translated along the axis of the rotor, and the rotating plate of each of which is articulated to three respective pitch rods for the blades, and the non-rotating plate of each of which is articulated to and moved by three respective operating actuators, and two other sets of swashplates, the rotating plate of each of said other two sets being articulated to two respective pitch rods for two nondiametrically opposed blades, and the non-rotating plate of each of said other two sets being articulated to two respective nondiametrically opposed operating actuators controlling only the inclinations of the corresponding non-rotating plate about the corresponding centre of pivoting.

Here too, it is still possible for this type of rotor for the blades controlled by the (n−1) identical sets of swashplates to be distributed in such a way that the last two pairs of blades, controlled by the other two sets of swashplates, do not each consist of two diametrically opposed blades.

Thus, a seven-bladed rotor is controlled by three sets of swashplates, one of which, identical to the one conventionally used in a three-bladed rotor, controls three blades of the rotor, while each of the other two sets is of the fixed-centre type and controls a respective two of the other four blades, under the action of two respective actuators.

In a quest for improved safety, the device of the invention may be contrived to display reduced authority, applying a conventional monocyclic control law in the event of a breakdown in the individual control device which in one of the aforementioned configurations has full authority and, for this, each operating actuator is articulated not only to a non-rotating plate, but also to a non-rotating safety plate inserted between the sets of swashplates and the stationary structure of the aircraft, to which the safety plate is connected by anti-rotation means, the safety plate being translatable along the axis of the rotor and inclinable in all directions about its centre under the action of position-control means inserted between the safety plate and the stationary structure, and preferably comprising three safety actuators, each articulated on the one hand to the safety plate, and on the other hand to said stationary structure.

The attraction of such a device is that it allows the active pitch control functions to be decoupled. The non-rotating safety plate, which is inclinable and translatable, and its position-control means make it possible for the monocyclic pitch of all the blades to be controlled in a conventional way. As the control law takes into account only the first order, the so-called "safety" actuators revert to quasistatic operation. Each set of swashplates, for its part, controls the individual pitch of one, two or three blades, its actuators operating according to control laws which take only the harmonics into account. The excursions of these actuators, for example so-called operating rams, are thus limited.

Advantageously, in this alternative form, the device is supplemented by means for locking the individual pitch control for each blade, said locking means being borne by said operating actuators, and allowing only monocyclic control of the blades by controlling the translations and inclinations of the safety plate. For this, the locking means advantageously comprise, for each operating actuator, a device for locking said operating actuator in a neutral position, which locking device may comprise two racks, each of which is intended to block the corresponding operating actuator in one respectively of the two directions in which said actuator can be operated.

In a simple way, the safety plate can be inclined on a central ball joint mounted so that it can slide axially about the rotor mast or about a sleeve surrounding this mast. If at least one of the sets of swashplates has its non-rotating plate only inclined by two corresponding operating actuators about the corresponding centre of pivoting on the axis of the rotor, this centre of pivoting is advantageously defined on a sleeve mounted so that it can slide axially about the rotor mask, and bearing the central ball joint of the safety plate.

Furthermore, when the rotating plates of two neighbouring sets of swashplates have different diameters, the device advantageously comprises two non-rotating mechanisms with articulated levers, each inserted between an operating actuator of the non-rotating plate of one of the two sets and said non-rotating plate so as to give to one of the two sets an inclination which differs from that of the safety plate, so as to compensate for the differences in diameter between the rotating plates.

In all the embodiments described hereinabove, if the sets of swashplates are considered along the axis of the rotor, their rotating plates may, for example, be mounted so that they rotate either all on the inside or all on the outside of the respective non-rotating plates. In the first instance (rotating plates on the inside), at least one pitch rod passes through an aperture made in each rotating plate of the sets of swashplates inserted between the rotating plate to which said rod is articulated and the blades that said rotating plate controls.

In the second instance (rotating plates on the outside), at least one actuator passes through an aperture made in each non-rotating plate of the sets of swashplates inserted between the non-rotating plate to which said actuator is articulated and a non-rotating structure.

There are numerous combinations of positions of the plates of the various sets, leading to numerous alternative forms of the invention.

For example, in the case of a rotor with two sets of swashplates, there is an alternative form in which it is the rotating plate of that one of the two neighbouring sets of swashplates along the axis of the rotor which is inserted between the other set of swashplates and the stationary structure of the aircraft which is mounted so that it can rotate about the corresponding non-rotating plate, whereas the rotating plate of said other set of swashplates is mounted so that it can rotate on the inside of the corresponding non-rotating plate, and pitch rods, articulated to the rotating plate of that one of the sets of swashplates which is inserted axially between the other set and the structure of the aircraft, pass through apertures in the rotating plate of the other set.

In some of these configurations, and in particular when the rotating plates have more or less the same diameter, it may be advantageous for at least one of the pitch rods not to be straight and to be articulated to the corresponding rotating plate by articulation means which prevent said rod from rotating about an axis perpendicular to said rotating plate, such as articulation means using cardan joints.

Finally, in these various embodiments, it is possible for two neighbouring sets of swashplates along the axis of the rotor to have their non-rotating plates connected to one another and to the stationary structure of the aircraft by at least one anti-rotation articulated double scissors and/or to have their rotating plates connected to one another and to the rotor by at least one rotational-drive articulated double scissors.

Figure 2:
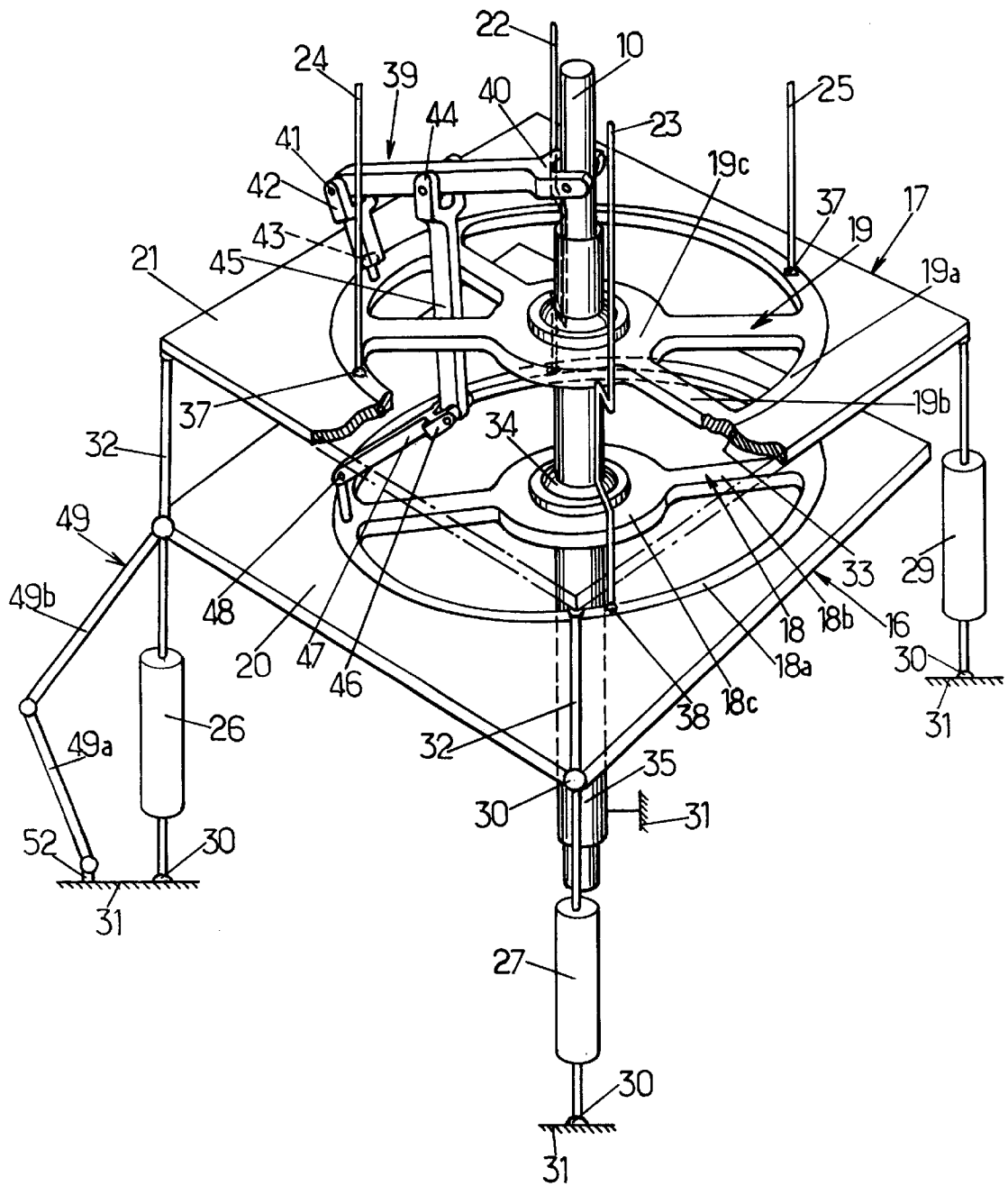
Figure 3:
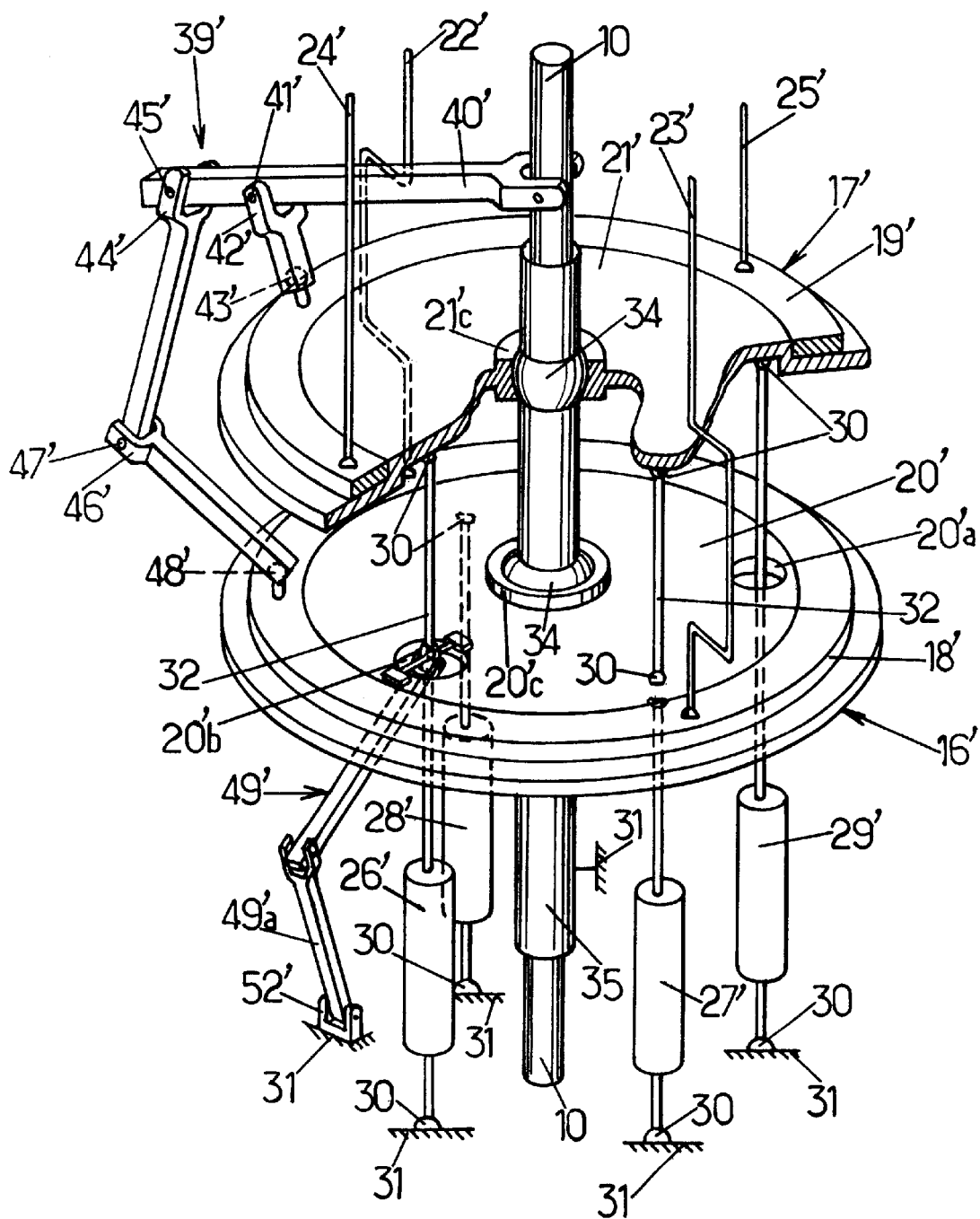
Figure 4:
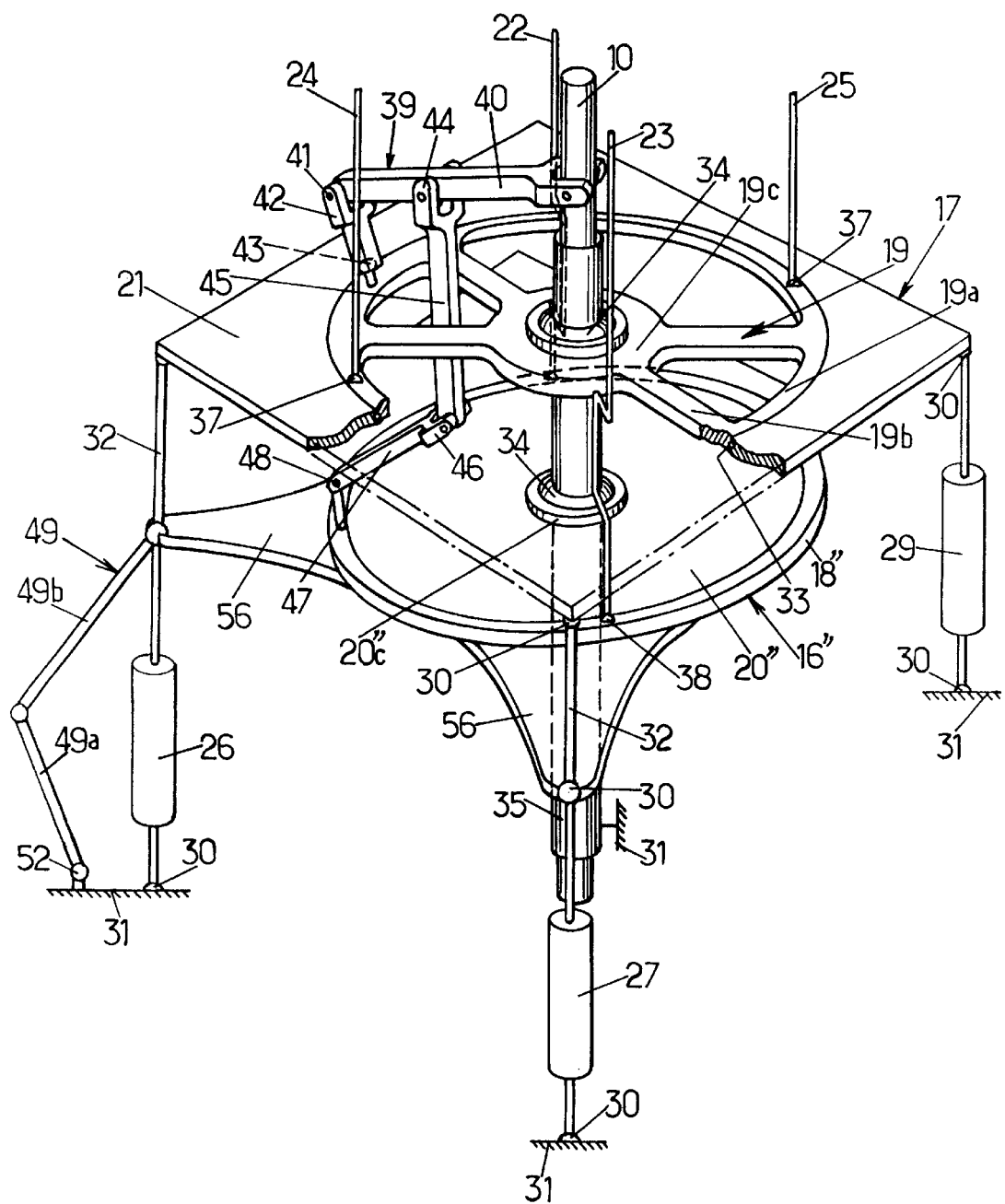
Figure 5:
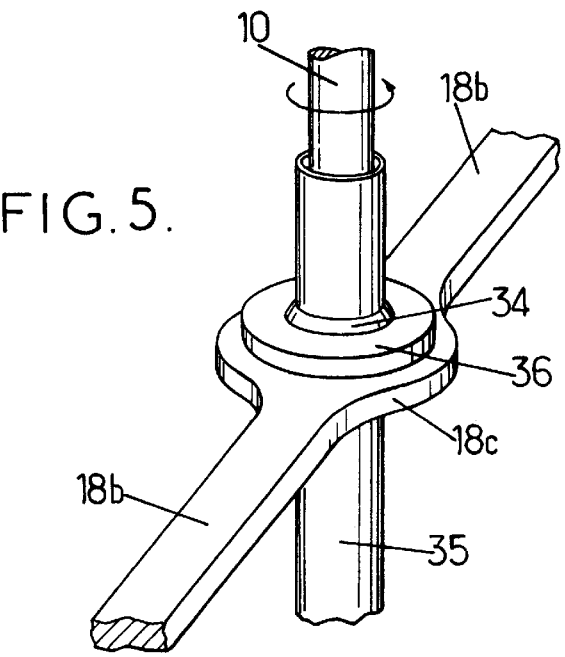
Figure 6:
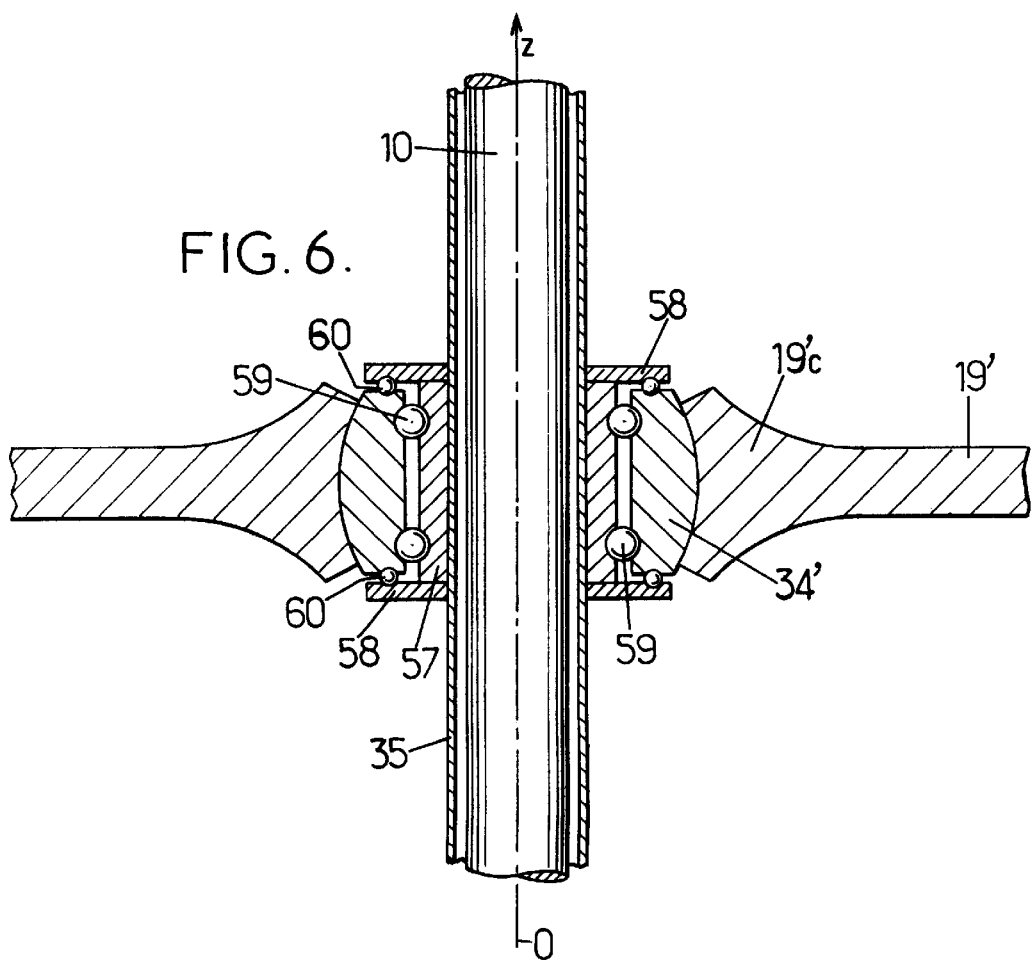
Figure 7:
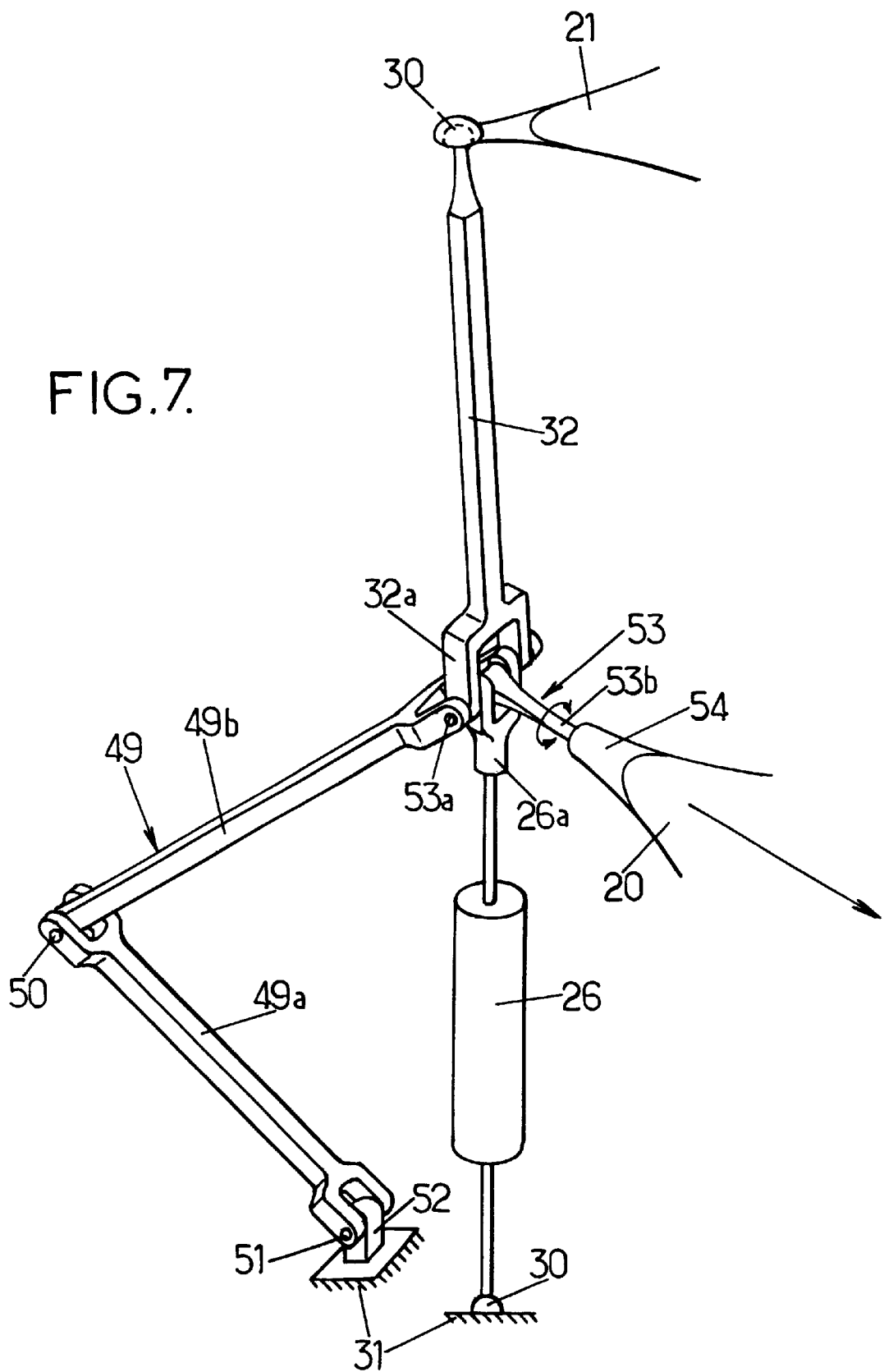
Figure 8:
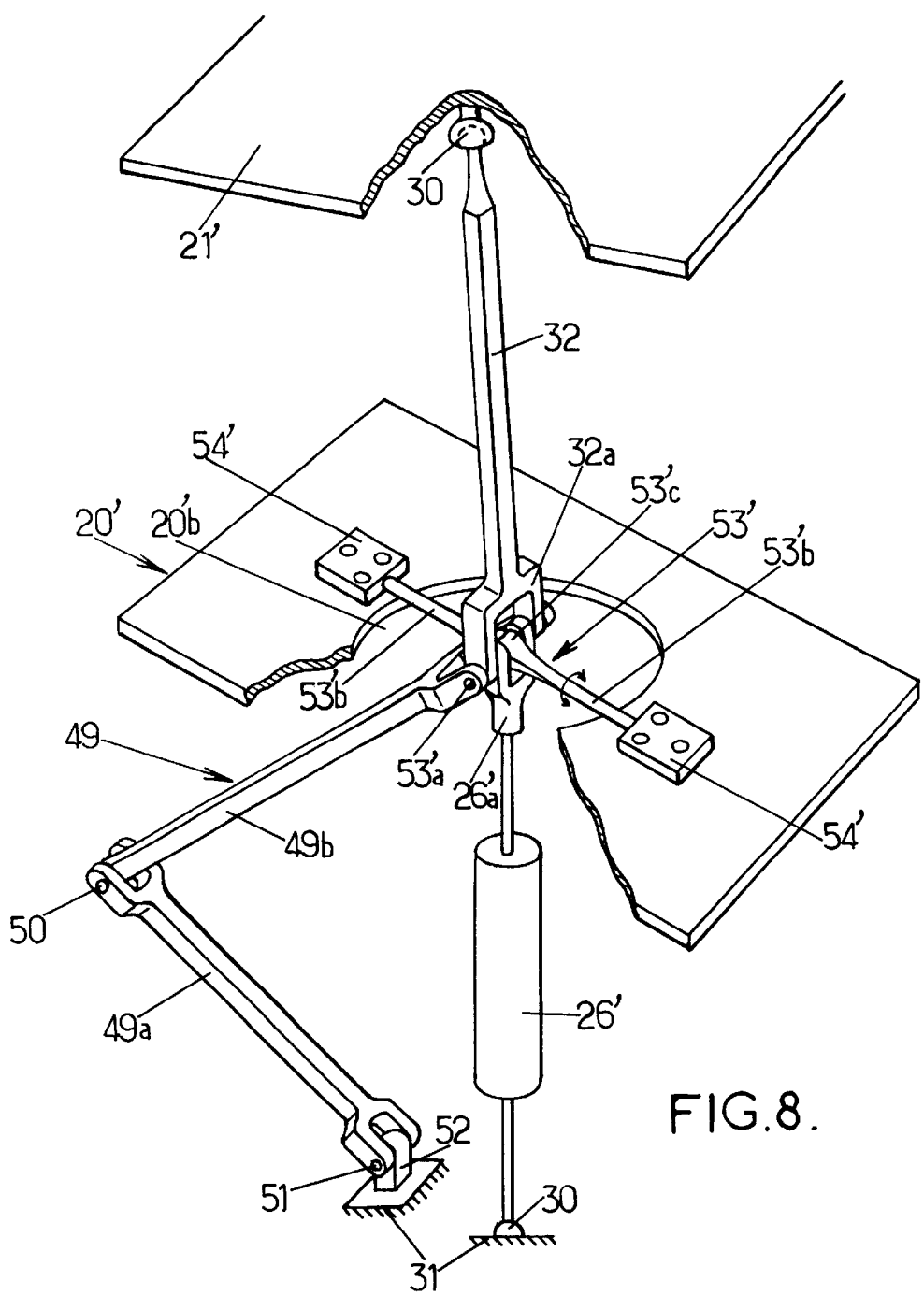
Figure 8A:
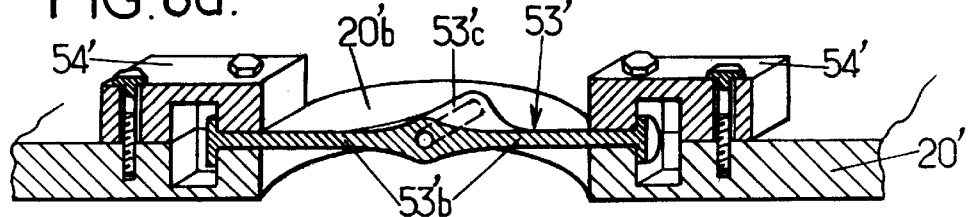
Figure 9:
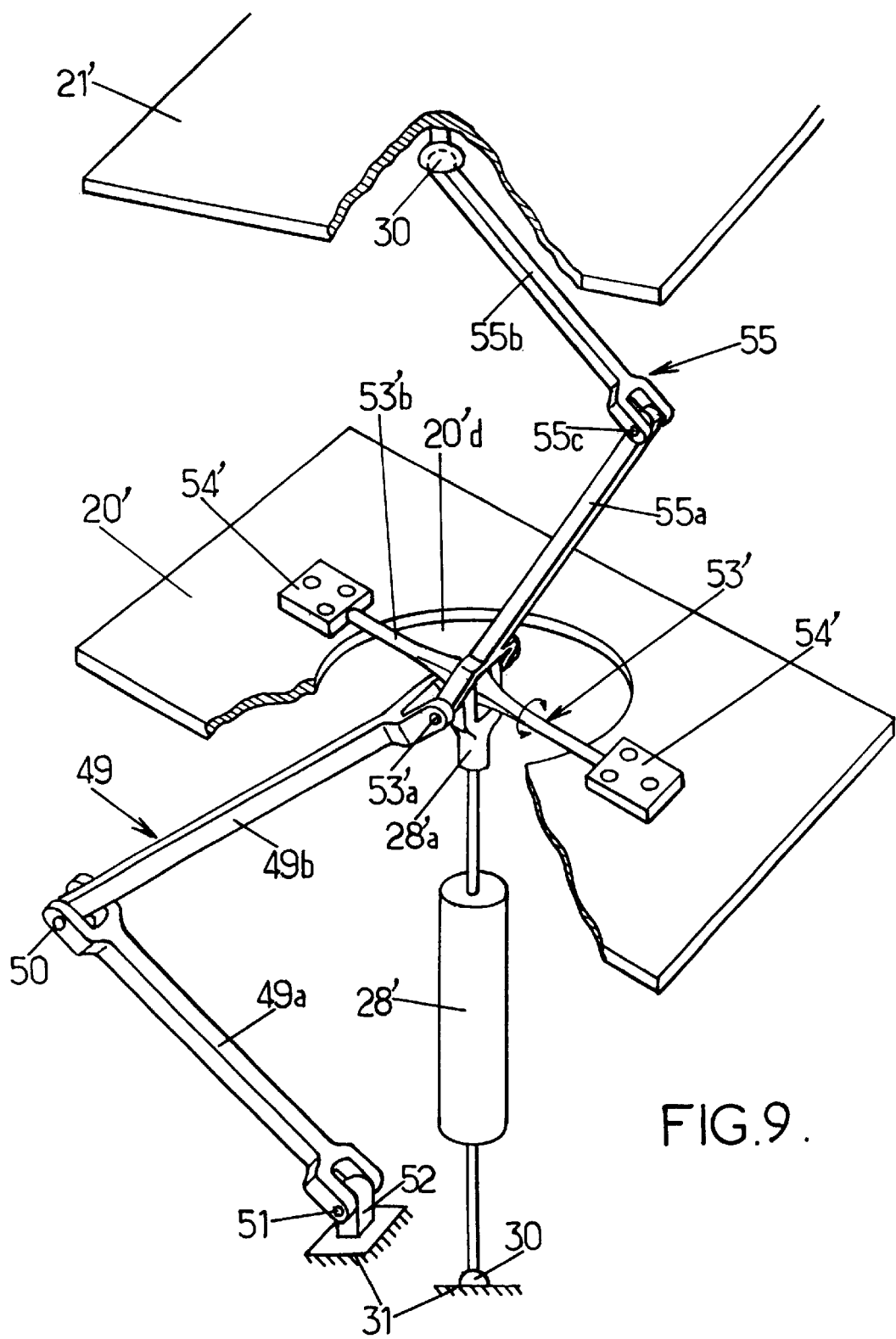

Other features and advantages of the invention will emerge from the description hereinabove, by way of non-limiting example, of embodiments which are described with reference to the appending drawings, in which:

FIG. 1 is a diagram of a device with two sets of swashplates, for the individual control of blades grouped in pairs of diametrically opposed blades (or blades at 180°) of a four-bladed helicopter main rotor, FIGS. 2, 3 and 4 depict three examples of devices according to FIG. 1, respectively with two rotating plates on the inside, with two rotating plates on the outside, and with an upper rotating plate on the inside and a lower rotating plate on the outside, FIGS. 5 and 6 depict ways of mounting the centre of a rotating plate about the rotor mast, FIGS. 7 to 9 depict examples of anti-rotation means for the devices of FIGS. 2 to 4, FIG. 8a depicts a detail of the attachment of the anti-rotation means of FIG. 8, FIGS. 10, 11 and 12 diagrammatically depict three examples of devices with two sets of swashplates, nondiametrically opposed blades with each set of swashplates, for a four-bladed helicopter main rotor, respectively with two rotating plates on the inside, with two rotating plates on the outside, and with an upper rotating plate on the inside and a lower rotating plate on the outside.

Figure 10:
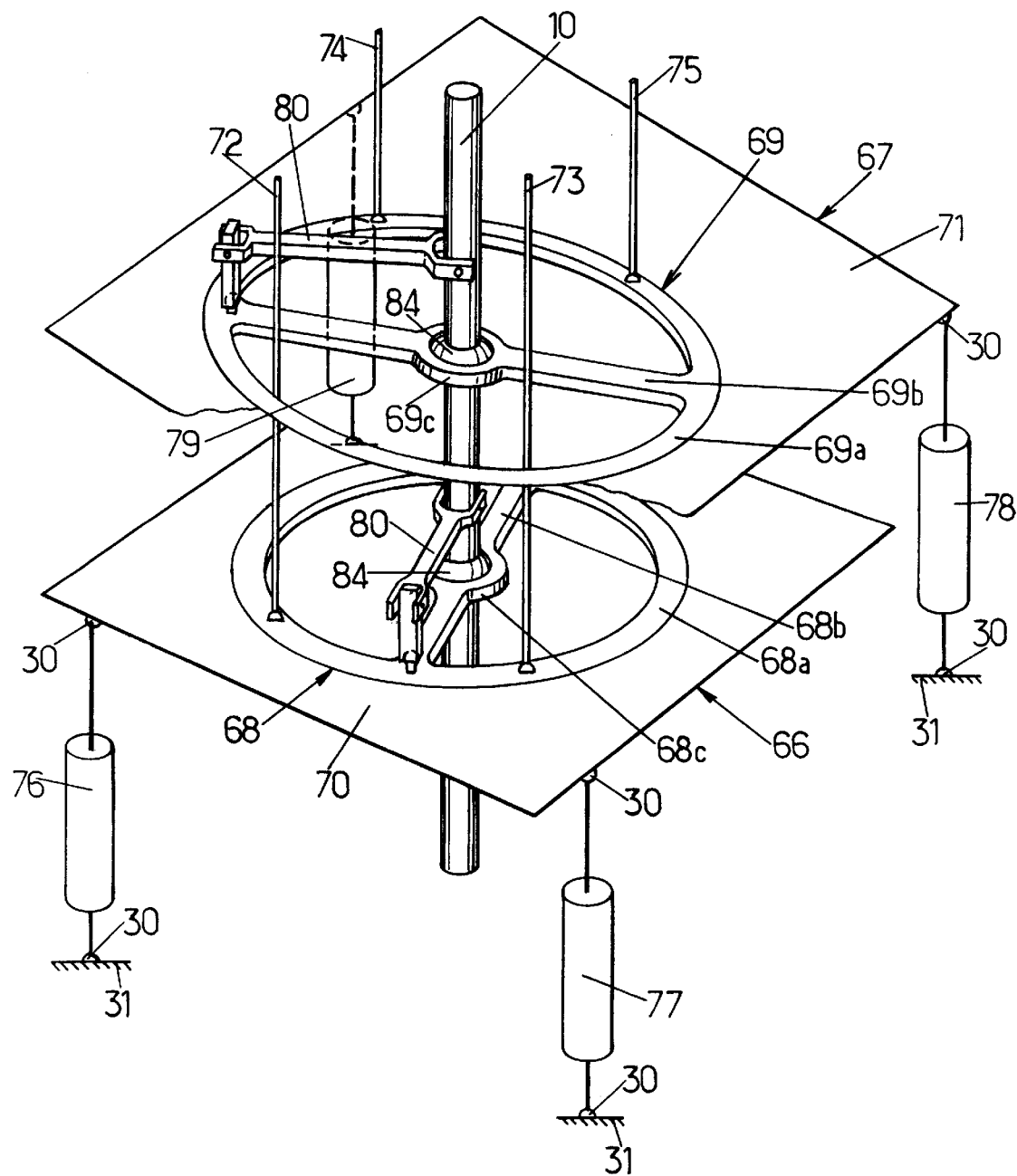
Figure 11:
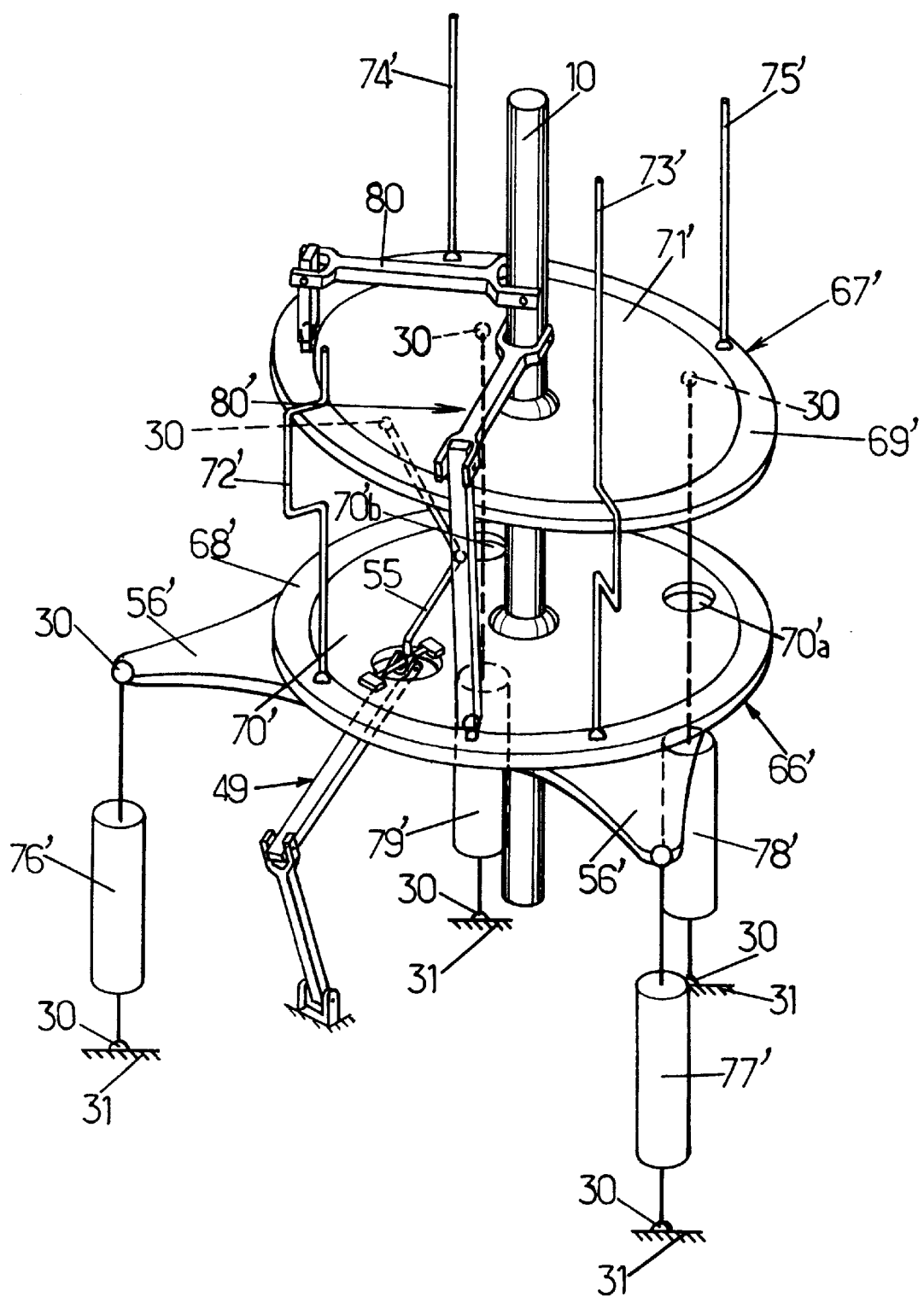
Figure 12:
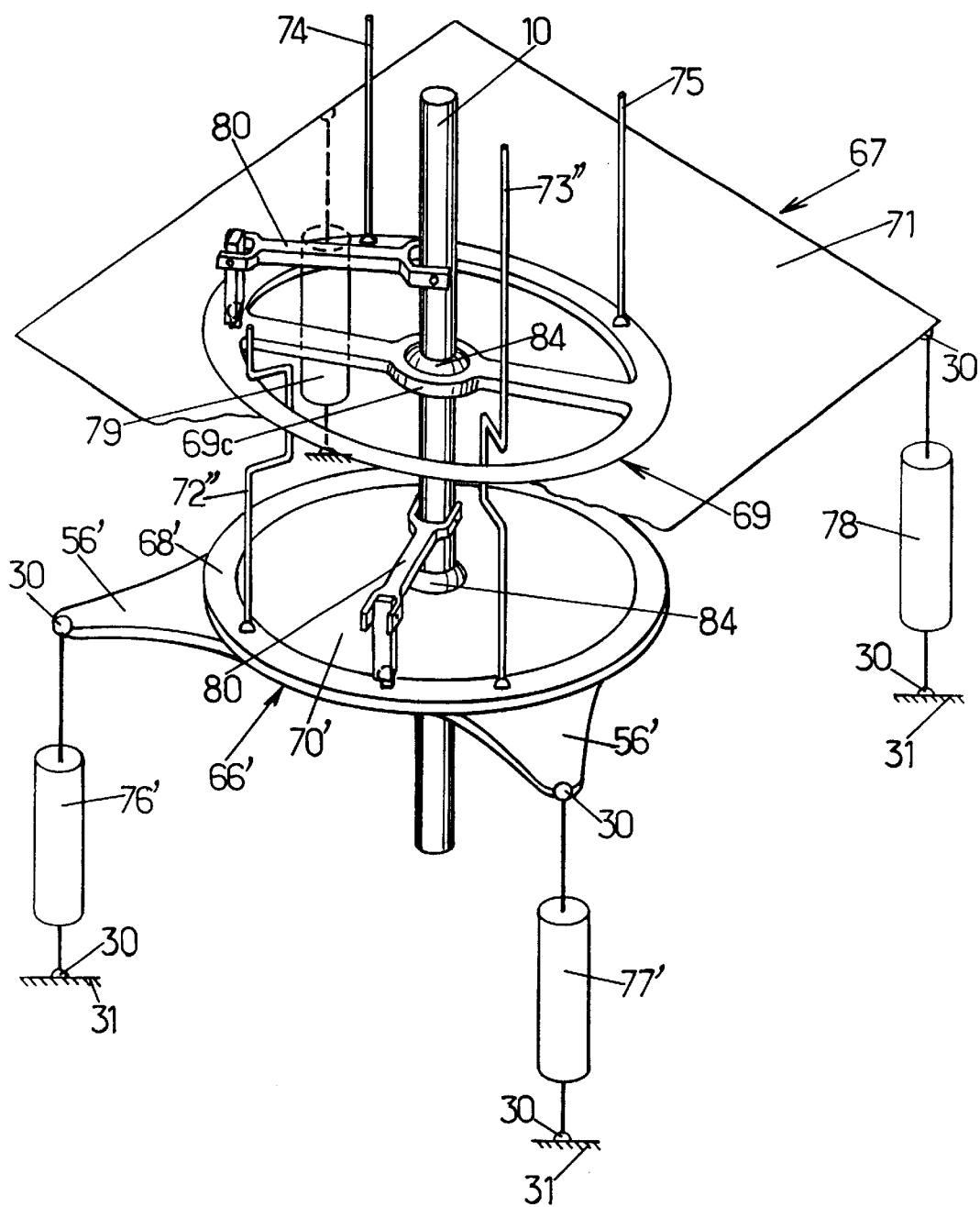
Figure 13:
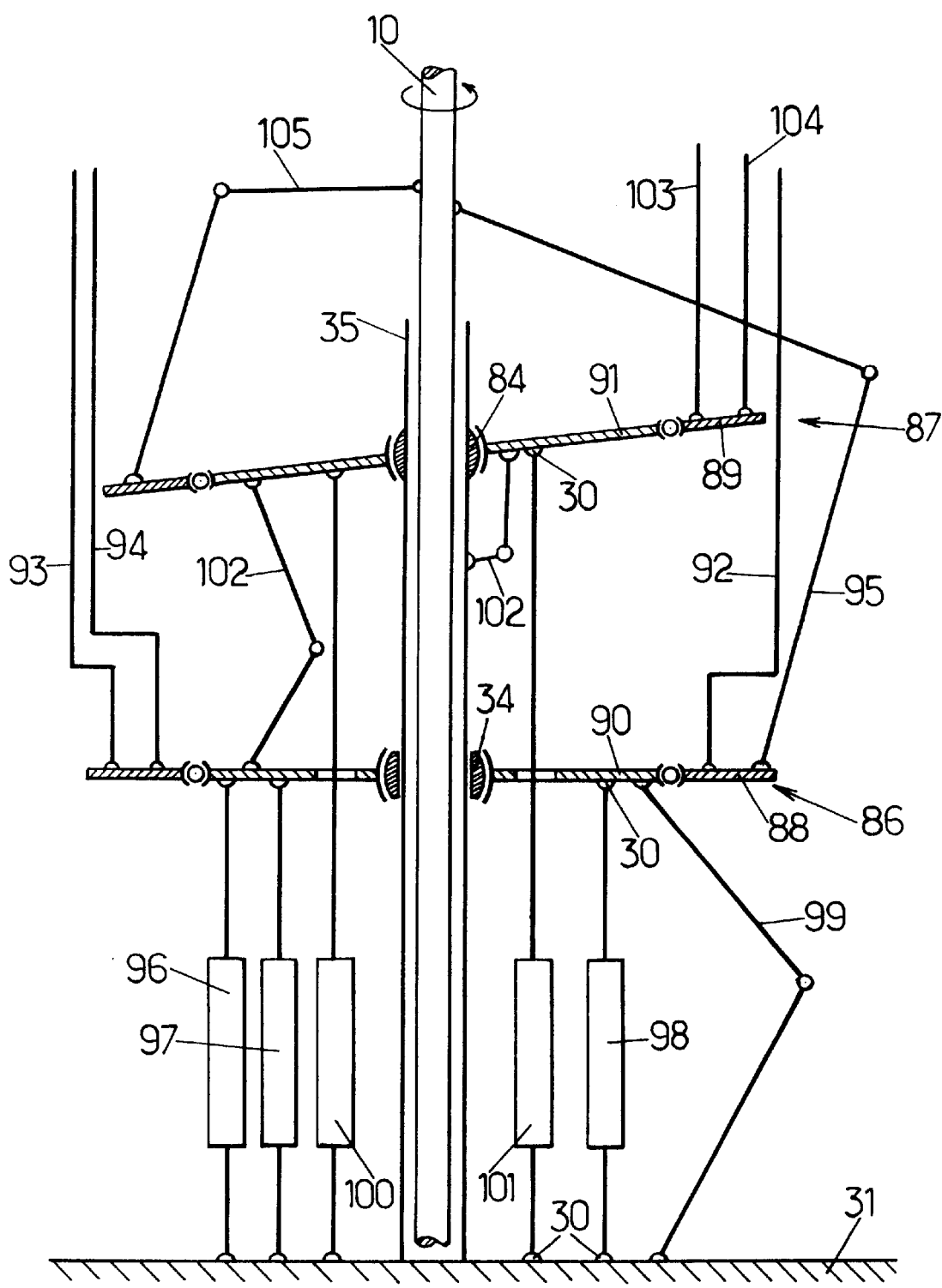
Figure 14:
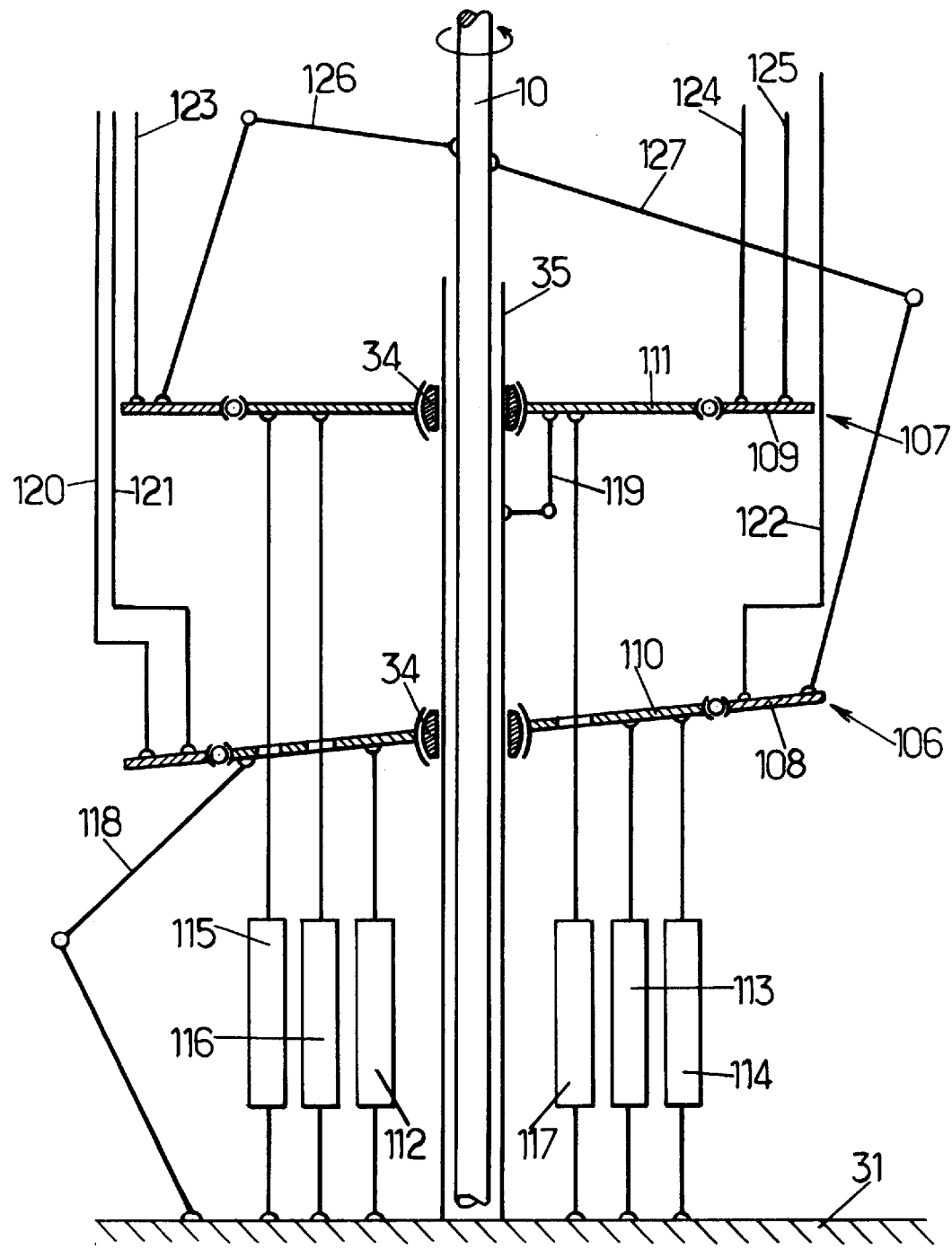
Figure 15:
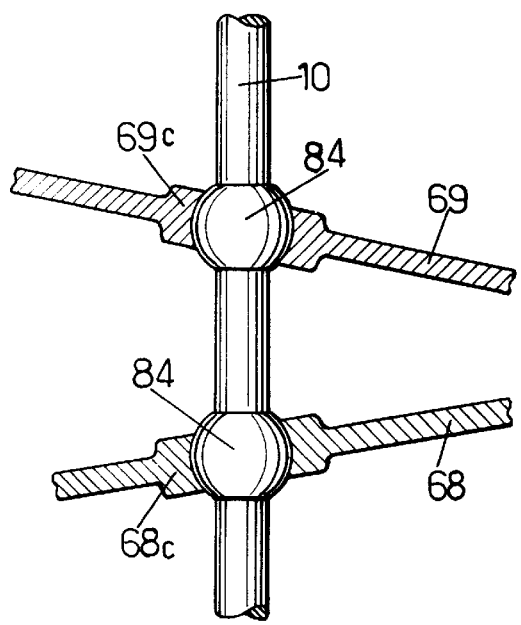
Figure 17:
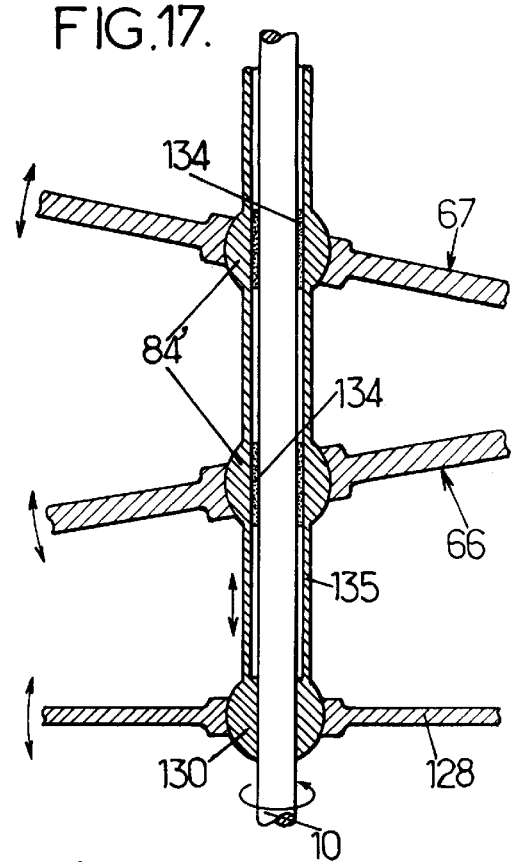
Figure 16:
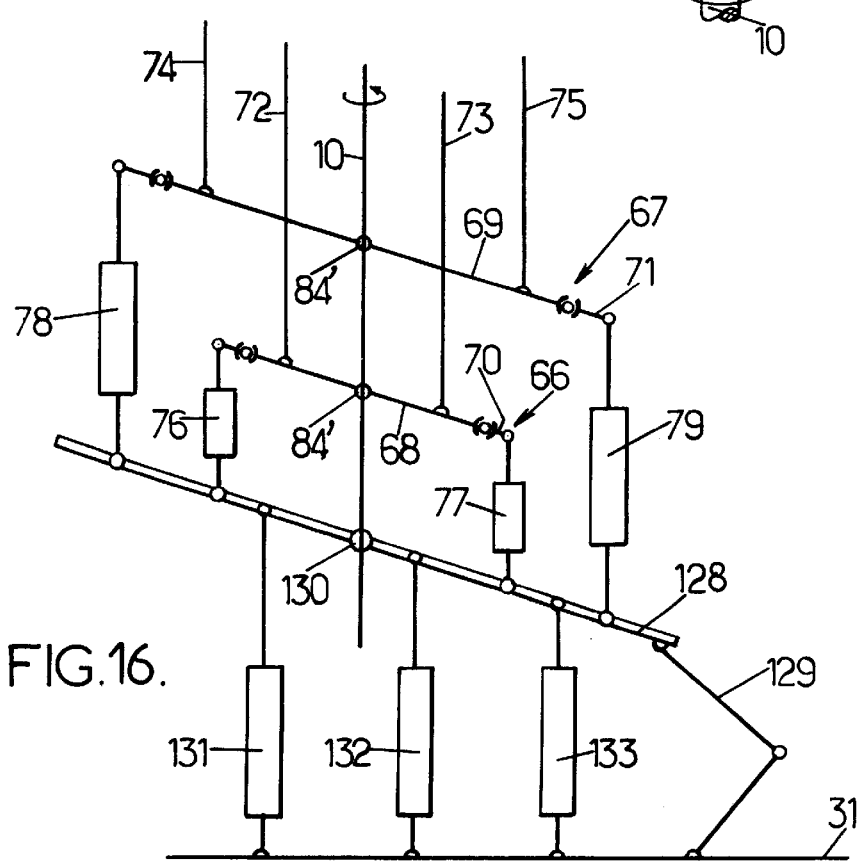
Figure 18:
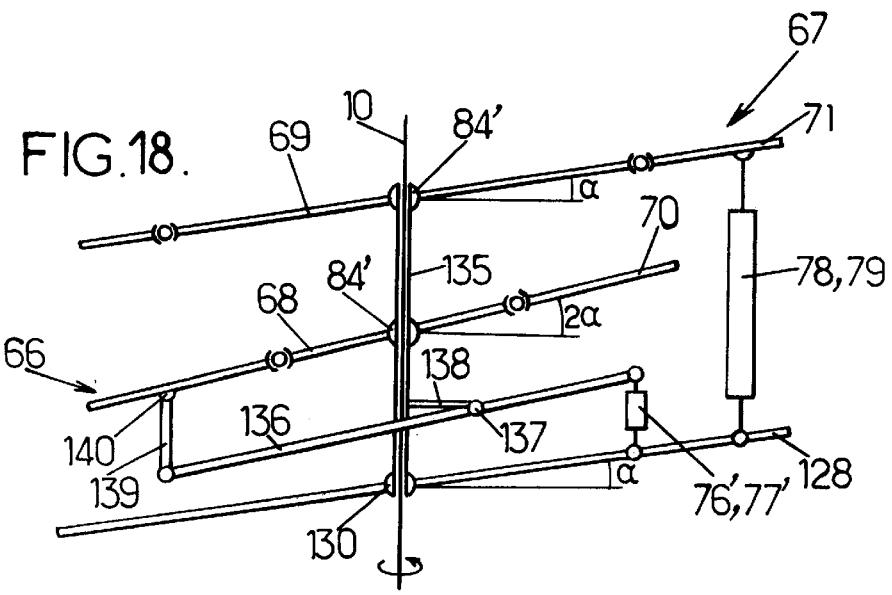
Figure 19:
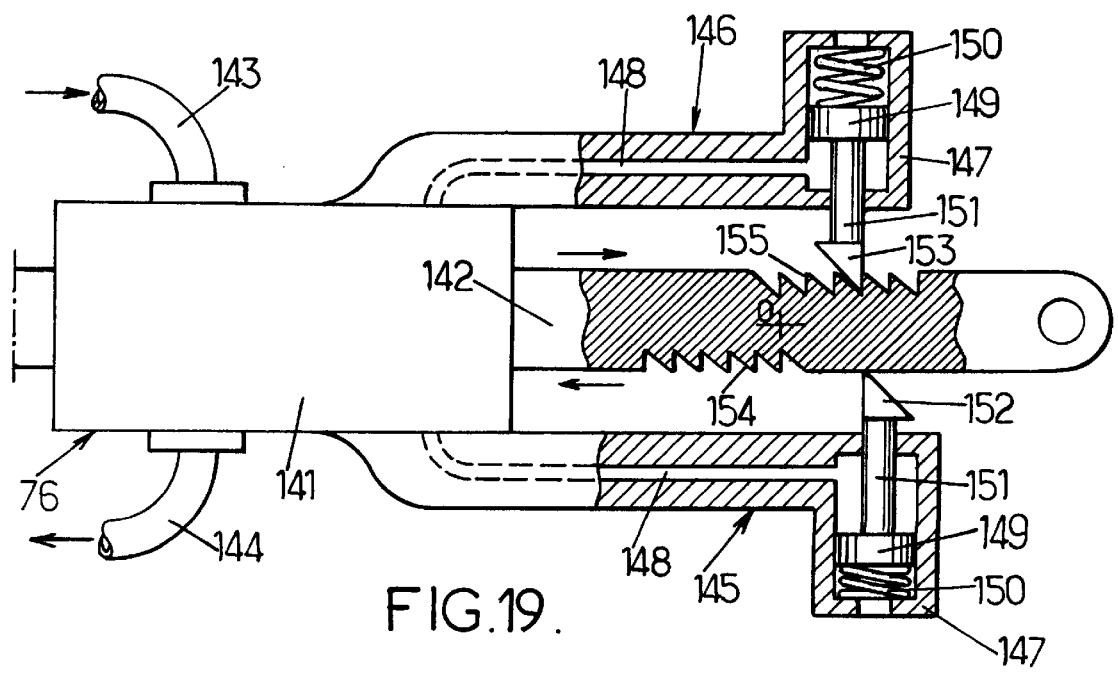

FIGS. 13 and 14 diagrammatically depict devices for rotors with five blades and with six blades respectively, FIG. 15 diagrammatically depicts the way to mount two plates of sets of swashplates of the fixed-centre type according to FIGS. 10 to 12 on the rotor mast in an individual control device with full authority, FIG. 16 diagrammatically and partially depicts a control device with reduced authority, with an additional safety plate, FIG. 17 is similar to FIG. 15 for a device with reduced authority according to FIG. 16, FIG. 18 diagrammatically depicts an alternative form of the device with reduced authority of FIG. 16, with rotating plates of different diameters, and a device for compensating for the inclination of the plates using an articulated lever, FIG. 19 diagrammatically depicts, partly in section and partly in side elevation, a ram with a device for locking in the neutral position, which can be used as an operating actuator in a device with reduced authority according to FIG. 16.

FIG. 1 diagrammatically depicts a four-bladed helicopter main rotor equipped with a device for the individual control of blades grouped into two pairs of diametrically opposed blades, or blades at 180°.

The rotor comprises a rotor mast 10, depicted by the axis of rotation Oz of the rotor, and rotating about this axis Oz four blades 11, 12, 13, 14 which are opposed in pairs with respect to the axis Oz, via a hub 15. The blades 11 to 14 each have a pitch lever 11a, 12a, 13a and 14a, generally projecting towards the leading edge or the trailing edge of the corresponding blade, and whose movements in a plane more or less perpendicular to the longitudinal pitch-change axis of the corresponding blade allow the pitch to be controlled. These movements are controlled by an individual pitch control device which comprises two sets of swashplates 16 and 17, each of which has a centre of rotation of its rotating plate and a centre of pivoting of its non-rotating plate, which are coincident and lie on the rotor axis, at a point called the centre of the set of swashplates and which is offset axially with respect to the common centre of rotation and of pivoting of the other set, and each depicted in the form of a plane or plate, each set 16 or 17 controlling two opposed blades. The blades 11 and 12 controlled by the upper set 17 are 180° from one another, as are the blades 13 and 14 controlled by the lower set 16.

In the known way, each set 16 or 17 of swashplates is mounted so that it can be inclined on its centre O' or O of pivoting in any direction by means forming a spherical ball joint, and at the same time translatable along the axis Oz, by having the ball joint means mounted so that it can slide about the rotor mast 10. In addition, each set of swashplates 16 or 17 comprises two annular plates surrounding the rotor mast 10 and one of which is the rotating plate, rotated about the corresponding centre of rotation for example by the rotor mast 10 by means of an articulated scissors and mounted so that it can rotate on a non-rotating plate, which is held by being connected to a stationary structure of the helicopter by anti-rotation means, such as a non-rotating articulated scissors. Furthermore, the rotating plate of each set 16 or 17 is connected to the pitch levers of the blades which it controls by pitch rods, while the translations and inclinations of the sets 16 and 17 are controlled by operating actuators, such as hydraulic rams, inserted between the stationary structure of the helicopter and the sets 16 and 17 of swashplates, and articulated by ball joints on the one hand to this stationary structure and on the other hand to the non-rotating plates of the sets 16 and 17.

In FIG. 1, each set 16 or 17 of swashplates is depicted with a central rotating plate 18 or 19 rotating, about the centre O or O' on the axis Oz on the inside of an outer non-rotating plate 20 or 21, the lower (closest to the helicopter structure) rotating plate 18 being connected to the two blades 13 and 14 whose pitch is controlled by two diametrically opposed pitch rods 22 and 23, each of which is articulated by ball joints at its lower end to this rotating plate 18 and at its upper end to the end of the corresponding pitch lever 13a or 14a.

Likewise, the upper (closest to the blades) rotating plate 19 is connected to the two blades 11 and 12 whose pitch is controlled by two diametrically opposed pitch rods 24 and 25, each of which is articulated by ball joints at its lower end to the rotating plate 19 and at its upper end to the end of the corresponding pitch lever 11a or 12a.

Each set of plates 16 and 17 have to be supported at three points of its respective non-rotating plate 20 or 21, and the vertical position of these points is determined by the four operating rams or actuators 26, 27, 28, 29, of which there are as many as there are blades, and which are mounted in a stationary reference frame, that is to say a reference frame which does not rotate about the axis of the rotor Oz, being articulated by ball joints such as 30, on the one hand, at the lower end, to the stationary structure 31 of the helicopter and, on the other hand, at their upper end, to the non-rotating plates 20 and 21.

Since the four rams 26 to 29 have to determine six points, referenced as 1, 2, 3 on set 17 and as 1', 2', 3' on set 16, two rams 26 and 27 each control the position of two points, one of which is on each set of plates 16 or 17, and the other two rams 28 and 29 each control just one point, one of them, 28, the point 3' of set 16 and the other of them, 29, the point 2 of set 17.

For the rams 26 and 27 to control the position not only of the points 1' and 2' respectively of the lower set of plates 16, but also of the points 3 and 1 respectively of the upper set of plates 17, the two non-rotating plates 20 and 21 are connected to one another by two rigid bars 32 of constant length, each articulated to the two non-rotating plates, one of them, between the points 1' and 3 and the other between the points 2' and 1 of these two plates.

A mathematical analysis of this system can be set out as follows.

In FIG. 1, the position of the upper set of plates 17 is determined by the heights (or variations in height from a reference plane, for example a horizontal reference plane) $h_1$, $h_2$, $h_3$ of the points 1, 2, 3 and the position of the lower set of plates 16 is determined by the heights $h'_1$, $h'_2$, $h'_3$ of the points 1', 2', 3'. The following two relationships hold: $h'_1=h_3$ and $h'_2=h_1$, because the points 1' and 3, and the points 2' and 1 are connected by the bar 32.

All the rams 26 to 29 lie at a distance R from the axis of the rotor Oz.

In an absolute reference frame OXYZ associated with the stationary structure 31 and such that OZ is coincident with the axis of the rotor Oz of the reference frame Oxyz or O'x'y'z rotating about Oz, a plane can be defined by the equation: aX+bY+Z=d.

If a, b and d are the coefficients of the plane of the upper set of plates 17, then:

$$\begin{pmatrix} a \\ b \\ d \end{pmatrix} = -\frac{1}{R} \begin{pmatrix} 1 & -\frac{1}{2} & -\frac{1}{2} \\ 0 & \frac{1}{2} & -\frac{1}{2} \\ 0 & -\frac{R}{2} & -\frac{R}{2} \end{pmatrix} \begin{pmatrix} h_1 \\ h_2 \\ h_3 \end{pmatrix} \quad (B-1)$$

The upper set of plates 17 controls two blades, the blade 11, whose azimuth in the absolute reference frame is $\Phi = \Omega t + \psi$, where $\Omega$ is the rotational speed of the rotor and t is time, and the blade 12, whose azimuth is $\Phi_2 = \Phi + \pi$. The heights of the foot of the rods 24 and 25 of the blades 11 and 12 are $H_1$ and $H_2$.

The following is true:

$$\begin{pmatrix} H_1 \\ H_2 \end{pmatrix} = -\begin{pmatrix} r\cos\Phi & r\sin\Phi & -1 \\ -r\cos\Phi & -r\sin\Phi & -1 \end{pmatrix} \begin{pmatrix} a \\ b \\ d \end{pmatrix} \quad (B-2)$$

where r is the radius of the rotating plate 19 of the upper set of plates 17.

Combining (B-1) and (B-2), we get:

$$\begin{pmatrix} H_1 \\ H_2 \end{pmatrix} = \quad (B-3)$$

$$\frac{1}{R} \begin{pmatrix} r\cos\Phi & -\frac{r}{2}\cos\Phi + \frac{r}{2}\sin\Phi + \frac{R}{2} & -\frac{r}{2}\cos\Phi - \frac{r}{2}\sin\Phi + \frac{R}{2} \\ -r\cos\Phi & \frac{r}{2}\cos\Phi - \frac{r}{2}\sin\Phi + \frac{R}{2} & \frac{r}{2}\cos\Phi + \frac{r}{2}\sin\Phi + \frac{R}{2} \end{pmatrix}$$

$$\begin{pmatrix} h_1 \\ h_2 \\ h_3 \end{pmatrix}$$

The lower set 16 controls the blades 13 and 14, and it is assumed that the azimuth of the blade 13 is:

$$\Phi' = \Phi - \frac{\pi}{2}$$

In this case, the relative position of blade 13 with respect to the rams 26, 27 and 28, connected to the points 1', 2', 3' is the same as the relative position of the blade 11 with respect to the rams 26, 27 and 29, connected to the points 1, 2, 3.

The blade 14 has the azimuth:

$$\Phi'_2 = \Phi + \frac{\pi}{2}.$$

The relative position of the blade 14 with respect to the rams 26, 27 and 28, connected to the points 1', 2', 3' is the same as the relative position of the blade 12 with respect to the rams 26, 27 and 29, connected to the points 1, 2, 3. Thus the system B-4 can immediately be deduced from the system B-3, simply by changing r to r', if the rotating plate 18 of the lower set 16 has a radius r' which differs from the radius r of the rotating plate 19, and where H'1 and H'2 are the heights of the foot of the rods 22 and 23 of the blades 13 and 14.

$$\begin{pmatrix} H'_1 \\ H'_2 \end{pmatrix} = \frac{1}{R} \begin{pmatrix} r'\cos\Phi & -\frac{r'}{2}\cos\Phi + \frac{r'}{2}\sin\Phi + \frac{R}{2} & -\frac{r'}{2}\cos\Phi - \frac{r'}{2}\sin\Phi + \frac{R}{2} \\ -r'\cos\Phi & \frac{r'}{2}\cos\Phi - \frac{r'}{2}\sin\Phi + \frac{R}{2} & \frac{r'}{2}\cos\Phi + \frac{r'}{2}\sin\Phi + \frac{R}{2} \end{pmatrix} \begin{pmatrix} h'_1 \\ h'_2 \\ h'_3 \end{pmatrix} \quad (B-4)$$

In (B-4), the angle $\Phi$ is the angle of the blade 11 controlled by the upper set of plates 17 with the point 1. By combining (B-3) and (B-4), and taking into account the relationship between the h values and the h' values, we can finally write:

$$\begin{pmatrix} H_1 \\ H_2 \\ H'_1 \\ H'_2 \end{pmatrix} = \frac{1}{R} \begin{pmatrix} r\cos\Phi & -\frac{r}{2}\cos\Phi + \frac{r}{2}\sin\Phi + \frac{R}{2} & -\frac{r}{2}\cos\Phi - \frac{r}{2}\sin\Phi + \frac{R}{2} & 0 \\ -r\cos\Phi & \frac{r}{2}\cos\Phi - \frac{r}{2}\sin\Phi + \frac{R}{2} & \frac{r}{2}\cos\Phi + \frac{r}{2}\sin\Phi + \frac{R}{2} & 0 \\ -\frac{r'}{2}\cos\Phi + \frac{r'}{2}\sin\Phi + \frac{R}{2} & 0 & r'\cos\Phi & -\frac{r'}{2}\cos\Phi - \frac{r'}{2}\sin\Phi + \frac{R}{2} \\ \frac{r'}{2}\cos\Phi - \frac{r'}{2}\sin\Phi + \frac{R}{2} & 0 & -r'\cos\Phi & \frac{r'}{2}\cos\Phi + \frac{r'}{2}\sin\Phi + \frac{R}{2} \end{pmatrix} \begin{pmatrix} h_1 \\ h_2 \\ h_3 \\ h'_3 \end{pmatrix} \quad \text{(B-5)}$$

The system (B-5) now needs to be inverted to be sure of a one-to-one relationship needed for individual control of the pitch of the blades, between $H_1$, $H_2$, $H'_1$, $H'_2$ and $h_1$, $h_2$, $h_3$, $h'_3$. This yields:

$$\begin{pmatrix} h_1 \\ h_2 \\ h_3 \\ h_4 \end{pmatrix} = \begin{pmatrix} -\frac{\cos\Phi}{2}A & -\frac{\cos\Phi}{2}B & \frac{\sin\Phi}{2}A' & \frac{\sin\Phi}{2}B' \\ 1-\frac{\sin\Phi}{2}A & 1-\frac{\sin\Phi}{2}B & -\frac{\cos\Phi}{2}A' & -\frac{\cos\Phi}{2}B' \\ \frac{\sin\Phi}{2}A & \frac{\sin\Phi}{2}B & \frac{\cos\Phi}{2}A' & \frac{\cos\Phi}{2}B' \\ \frac{\cos\Phi}{2}A & \frac{\cos\Phi}{2}B & 1-\frac{\sin\Phi}{2}A' & 1-\frac{\sin\Phi}{2}B' \end{pmatrix} \begin{pmatrix} H_1 \\ H_2 \\ H'_1 \\ H'_2 \end{pmatrix} \quad \text{(B-6)}$$

In (B-6), we have set:

$$A = -\cos\Phi + \sin\Phi - \frac{R}{r}$$

$$B = -\cos\Phi + \sin\Phi + \frac{R}{r}$$

$$A' = +\cos\Phi + \sin\Phi + \frac{R}{r'}$$

$$B' = +\cos\Phi + \sin\Phi - \frac{R}{r'}$$

From equations (B-5) and (B-6) we can be sure of the validity of the configuration of FIG. 1, which is a device for blades at 180°, that can be used for individual control of blades with full authority when the rams 26 to 29 are articulated to the helicopter structure 31, but which can also be used for individual control with reduced authority when these rams are articulated to a safety plate, as described hereinbelow with reference to FIGS. 16 to 18.

The geometric configuration of FIG. 1 is not trivial, because other configurations have been tested and have to led to invertible systems, these other configurations therefore not making it possible to obtain any arbitrary independent movements for the four blades when they are taken in pairs in line with each other. Conversely, the device of FIG. 1 is not suitable when the blades of a pair of blades are at 90° from one another. For this, all that need be demonstrated is that, for a specific azimuth position, it is not possible to give the four blades any arbitrary incidence. If, shall we say, the upper set of plates 17 controls the blades 14 and 12 and the lower set of plates 16 controls the blades 13 and 11, assuming that the blade 13 is in the direction of the axis O'x' (see FIG. 1), the blade 11 is therefore in the direction of the axis O'y', the blade 14 in the direction of the axis Oy and the blade 12 in the opposite direction to the axis Ox. The pitch setting of the blade 13 is determined by the height of the point 1', and this also fixes the height of the point 3. The pitch setting of the blade 11 is determined by the height of the point 2', which also fixes the height of the point 1. Finally, the pitch setting of the blade 14 is determined by the height of the point 2. The height of points 1, 2, 3 of the upper non-rotating plate 21 is fixed, and the plane of this upper plate 21 is therefore fully determined, and there is no longer any degree of freedom available for arbitrarily fixing the pitch setting of the blade 12.

Thus, in the device of FIG. 1, each of the two rotating plates 18 and 19 control a respective one of the two pairs of diametrically opposed blades, and one, 20, of the two non-rotating plates is positioned by three rams 26, 27 and 28, while the other non-rotating plate 21 is positioned by the fourth ram 29 and the two bars 32 which transmit to the non-rotating plate 21 the movements imparted to the non-rotating plate 20 by the two rams 26 and 27.

A study of the equations in system (B-6) shows that to obtain a variation in the pitch of a blade at the frequency f, the rams have to be operated at a frequency $f'=f+2f_0$ where $f_0$ is the rotational frequency of the rotor and hits appreciably increases the passband needed for the rams 26 to 29, compared with that of the rams for individual control of the blades of a three-bladed rotor. The rotation of the non-rotating plates about the axis Oz of the rotor can be blocked, in the case of the lower plate 20, by a conventional articulated scissors and, in the case of the upper plate 21, by the bars 32 connecting it to the lower plate 20, as described hereinbelow and depicted in the examples of FIGS. 2 to 4 and 7 and 8.

FIG. 2 depicts an example of a device according to FIG. 1 with rotating plates on the inside.

Here again we see the two connecting bars 32 joining the lower 20 and the upper 21 non-rotating plates, and each in line respectively with one, 26 or 27, of two of the three rams (the third ram not being visible in FIG. 2) articulated between the stationary structure 31 of the helicopter and the non-rotating plate 20 of the lower set 16 of swashplates. Each bar 32 is, like each ram, articulated at its ends by two spherical ball joints 30 or equivalent means. Likewise, the fourth ram 29 is articulated to the stationary structure 31 and to the non-rotating plate 21 of the upper set 17 by two ball joints 30. The lower 18 and the upper 19 rotating plates are mounted so that they rotate on the inside of respectively the lower 20 and the upper 21 rotating plates, in the known way, by means of at least on ballbearing, as depicted diagrammatically as 33 in the case of the upper set 17.

In FIG. 2, each rotating plate 18 or 19 comprises a rim 18*a* or 19*a* connected by spokes 18*b* or 19*b* to a hub 18*c* or 19*c* that pivots on a central spherical ball joint 34 mounted so that it can slide axially about a sleeve 35 surrounding the rotor mast 10 but also fixed to the structure 31.

The articulation between a rotating plate and a central ball joint 34 is depicted in FIG. 5 in the case of the lower rotating plate 18. The ball joint 34, sliding on the sleeve 35 in the blades at 180° configuration, is surrounded by a ring 36 interacting with the ball joint 34 via a concave and spherical internal bearing surface, and bearing a ballbearing (not depicted) inserted between the ring 36 and the hub 18c of the lower rotating plate 18a.

The holed structure of the upper rotating plate 19 allows the two rods 22 and 23, articulated to the lower rotating plate 18, to pass through the apertures delimited between the spokes 19b of the upper rotating plate 19 without mechanically interfering with this plate, because the rotating plates 18 and 19, and therefore the rods 22 to 25 rotate at the same speed as the rotor and its blades. However, since the rotatng plates 18 and 19 have more or less the same diameter, the rods 22 and 23 driven by the lower rotating plate 18 are no longer straight, but have a shape suited to passing through the upper rotating plate 19, unlike the rods 24 and 25 which are straight and articulated by ball joints 37 to this upper rotating plate 19. Because of their non-straight shape, the rods 22 and 23 are articulated to the lower rotating plate 18 by means which prevent any rotation about an axis perpendicular to this plate 18, and therefore not by a ball joint but, for example, by an articulation using cardan joints 38.

Thus, by choosing any arbitrary, but appropriate shape for the rods articulated to the lower rotating plate, there is freedom to choose the diameters of the rotating plates.

Rotational drive to the rotating plates 18 and 19 is provided by an articulated double scissors 39 comprising an upper part driving the upper rotating plate 19, and consisting of a fork 40 pivoting about a diametral pin passing through the rotor mast 10 and the handle of which is articulated with pivoting at 41 in a second fork 42 which by its handle is articulated by means of a ball joint 43 to the rotating plate 19. The double scissors 39 also comprises a lower part with a fork 44 mounted pivoting on the handle of the fork 40, and the arm 45 of which is itself pivoting in another fork 46 itself articulated by its arm 47 to the lower rotating plate 18 via a ball joint 48. The ball joints 43 and 48 articulating the double driving compass 39 to the rotating plates 18 and 19 each provide freedom of rotation about two axes parallel to the plane of the corresponding rotating plate.

The two non-rotating plates 20 and 21 are held using an articulated anti-rotation scissors 49, depicted more specifically in FIG. 7. This scissors 49 comprises two branches 49a and 49b arranged as forks and mounted pivoting one on the other via a pivot 50, the lower branch 49a also being mounted so that it pivots about a pivot 51 parallel to the pivot 50 on a fitting 52 secured to the stationary structure 31. The upper branch 49b is also mounted so that it pivots, as is the forked lower end 32a of a bar 32, on the crossbar 53a parallel to the pivot 51 of the T-shaped pivot 53, the upright 53b of which pivots about its longitudinal axis, radial with respect to the rotor mast 10, in a sleeve 54 secured to the lower non-rotating plate 20. The upper end of the rod of the ram 26 is also shaped as a fork 26a pivoting about the crossbar 53a of the T-shaped pivot 53. This mounting makes it possible to use the bar 32, articulated by a spherical ball joint 30 at its upper end to the upper non-rotating plate 21, as an anti-rotation means associated with the scissors 49 for holding the two non-rotating plates 20 and 21.

Of course, it is possible to use a conventional articulated anti-rotation scissors to hold each of the two non-rotating plates 20 and 21, and it is possible to use two conventional articulated scissors, one to drive each one respectively of the two rotating plates 18 and 19, at the expense of greater bulk because the scissors for driving the lower rotating plate 18 will have to have at least one arm which is long enough to be articulated to the rotor mast 10 above the sleeve 35.

FIG. 3 is an alternative form of the device for blades at 180° of FIG. 1, in which the two rotating plates, the lower one 18' and the upper one 19', are on the outside, and rotate about the corresponding lower non-rotating plate 20' or upper non-rotating plate 21'.

Each of the non-rotating plates 20' and 21' is mounted so that it can pivot about the rotor mast 10 and so that it can slide parallel to this mast by means of a central spherical ball joint 34 which slides axially around the stationary sleeve 35 surrounding the mast 10 and on which the plate 20' or 21' is mounted directly so that it can pivot via its hub 20'c or 21'c, the insertion of a ring and of at least one rolling bearing between the ball joint and the plate hub, as described hereinabove with reference to FIG. 5, becoming optional on account of the fact that the plate concerned is a non-rotating plate.

The diametrically opposed rods 22' and 23' driven by the lower rotating plate 18' are not straight, as is also the case in the previous example, but in this example are deformed so that they can pass round the outside of the upper set 17' of the swashplates, the diameter of which is appreciably the same as that of the lower set 16' of swashplates, while the diametrically opposed rods 24' and 25' articulated by ball joints to the upper rotating plate 19' are straight. For these reasons, and as in FIG. 2, the non-straight rods 22' and 23' are articulated to the lower rotating plate 18' by cardan joints.

Like in FIG. 2, the rotating plates 18' and 19' are rotated, driven off the hub 10 and above the sleeve 35, by an articulated double scissors 39', the upper part of which has a fork 40' pivoting about a diametric pin passing through the mast 10, and articulated so that it pivots at 41' in a second fork 42' articulated by the handle by means of a spherical ball joint 43' to the upper rotating plate 19'. the other part of the scissors 39', which derives the lower rotating plate 18', also comprises two forks 44' and 46' passing round the outside of the upper set 17' of swashplates, and articulated, in the case of the first one 44', to the handle of the fork 40', about a pivot 45' on the outside of the fork 42', and in the case of the second one 46', by a ball joint 48' to the lower rotating plate 18', the forks 44' and 46' also being articulated with pivoting one on the other about the pivot 47'.

The two non-rotating plates 20' and 21' may be solid annular discs, except for the inside plate 20' which has at least two apertures, including one, 20'a, for the passage of the single ram 29' articulated by ball joints 30 directly to the underside of the upper non-rotating plate 21' and to the stationary structure 31. The other aperture 20'b in the plate 20' receives the articulations to this plate 20' of one, 26' of the three rams for controlling this plate 20', and of one of the two bars 32 connecting this plate 20' to the other non-rotating plate 21', to the underside of which this bar 32 is articulated by a ball joint 30 and of an anti-rotation scissors 49' which may be replaced by the structure described hereinbelow with reference to FIGS. 8 and 8a, corresponding to an alternative form of FIG. 7 and using this bar 32 as an anti-rotation means.

The other two rams 27' and 28' for controlling the plate 20' are articulated to the stationary structure 31 like on the underside of the plate 20' by ball joints 30, and the point of articulation on the underside of the plate 20' of the ram 27' is directly beneath the second bar 32 articulated by ball joints 30 to this plate 20' and to the underside of the upper non-rotating plate 21'.

FIG. 8 shows that the anti-rotation scissors 49' of FIG. 3, the forked lower branch 49'a of which is pivoted by its foot in a U-shaped fitting 52' secured to the stationary structure 31, may have a structure and be mounted in the same way as the scissors 49 of FIG. 7. It can once again be seen that the forked end 26'a of the ram 26' and the forked lower end 32a of the bar 32 and the fork of the upper branch 49b of the scissors 49 are mounted so that they can pivot about one and the safe pin 53'a housed in the bore of a transverse hub 53'c (see FIG. 8a) of a spider 53' suspended across the aperture 20'b of the plate 20' by its longitudinal arms 53'b which are torsion arms allowing rotation about their longitudinal axis, which is radial with respect to the axis of the rotor. FIG. 8a shows an example of attachment by their ends of the torsion arms 53'b of the spider 53' in housings delimited, in part, in the upper face of the non-rotating plate 20', and in part in the lower face of two supports 54' screwed to the plate 20' and trapping the ends of the arms 53'b against this plate 20'.

In this mounting too, one of the bars 32 providing the connection between the two non-rotating plates 20' and 21' is made to act as an anti-torque or anti-rotation scissors for the upper non-rotating plate 21'.

This can be avoided if the double anti-rotation scissors of FIG. 9 is adopted in place of the scissors 49 or 49' and of one bar 32 of FIGS. 3 and 8. In this case, the anti-rotation double scissors of FIG. 9 is articulated to the lower non-rotating plate 20' by means of a spider 53' identical to the one in FIG. 8 and mounted in the same way in an opening 20'd in the plate 20' in place of the articulation 30 to this plate 20' of the third ram 28', the action of which is not extended by a connecting bar such as 32.

The double anti-rotation scissors of FIG. 9 comprises a lower scissors, identical in its structure and in the way in which it is mounted to the scissors 49 of FIG. 8 and mounted so that it can pivot via the fork of its upper branch 49b about the transverse pivot pin 53'a of the spider 53' as is a fork 28'a of the upper end of the rod of the ram 28', and is the fork of the lower branch 55a of an upper articulated scissors 55 also comprising an upper branch 55b articulated by the spherical ball joint 30 to the underside of the upper non-rotating plate 21' and arranged as a fork in which there pivots the lower branch 55a, about a pivot 55c parallel to the axis of the pivot 53'a of the spider 53'. The upper scissors 55 of the double anti-rotation scissors holds the upper non-rotating plate 20''' with respect to the lower non-rotating plate 20', which is held in terms of rotation by the lower scissors 49 connecting it to the stationary structure 31.

The double anti-rotation scissors of FIG. 9 can also be used on devices with at least one set of fixed-centre swashplates of the type described hereinbelow with reference to FIGS. 10 to 12.

FIG. 4 depicts another alternative form of the device of FIG. 1, in which the upper set of swashplates is identical to the set 17 in FIG. 2, and comprises a holed rotating plate 19 pivoting via its hub 19c on a central ball joint 34 sliding about a stationary sleeve 35. This rotary plate 19 is articulated by ball joints 37 to two diametrically opposed and straight pitch rods 24 and 25 and mounted so as to rotate via a rolling bearing 33 inside a non-rotating plate 21 controlled by a single ram 29 articulated by ball joints 30 between the plate 21 and the stationary structure 31, and by two connecting bars 32 connecting it to the non-rotating plate of the lower set of swashplates 16'', which comprises a rotating plate 18'' on the outside, rotating about a non-rotating plate 20'' on the inside, in the form of a solid disc articulated by its hub 20''c to another spherical ball joint 34 sliding axially about the stationary sleeve 35.

Like in FIG. 2, the other two diametrically opposed rods 22 and 23 are not straight and are deformed inwards so that they pass through apertures in the upper rotating plate 19 and are articulated to the lower rotating plate 18'' by cardan joints 38.

Like in FIG. 2, the inside upper rotating plate 19 and the outside lower rotating plate 18'' are rotated by an articulated double scissors 39 which, in its structure and the way in which it is mounted, is identical to the one described with reference to FIG. 2. This double scissors 39 is therefore articulated with pivoting to the rotor mast 10, by a ball joint 43 to the upper rotating plate 19, and by a ball joint 48 to the lower rotating plate 18''.

For ease of mounting of the three rams for inclining and translating the lower set 16'', and just two of the rams 26 and 27 of which are visible in FIG. 4, the inside and lower non-rotating plate 20'' is extended radially, under the lower rotating plate 18'', by three arms 56, to the ends of which are articulated these three rams and, in the case of the two arms 56 visible in FIG. 4, also the bars 32 for connecting to the upper non-rotating plate 21.

As in FIG. 2 also, the means of preventing the rotation of the non-rotating plates 20'' and 21 comprise an articulated scissors identical to the scissors 49 in FIG. 2 and a bar 32, mounted in exactly the same way as in FIG. 7, the only difference being that the sleeve 54 receiving the upright of the T-shaped pivot 53 is secured to the outer radial end of the corresponding arm 56 of the lower non-rotating plate 20''.

When one of the rotating plates rotates on the inside of a non-rotating plate, as is the case of the two rotating plates 18 and 19 in FIG. 2 and the upper rotating plate 19 in FIG. 4, it is possible, in place of the hub of a rotating plate being mounted to pivot on a sliding central ball joint according to FIG. 5, to use the alternative assembly of FIG. 6, which is a view in section. In this type of assembly, the sleeve 35, which does not rotate and surrounds the rotor mast 10 without contacting it, which mast rotates about the axis of rotation Oz of the rotor, is itself surrounded by a ring 57 which can slide axially about the stationary sleeve 35. If need be, any rotational movement of the ring 57 about the sleeve 35 can be prevented by giving the sleeve 35 a non-cylindrical shape, at lest locally, or by using a groove at least in the sleeve 35, or alternatively by using other means of preventing rotation on the ring 57. Two radial flanges 58 are fixed to the axial ends of the ring 57 and have the task of absorbing vertical loading generated by the corresponding swashplates. The spherical ball joint 34' is mounted around the ring 57 and between the flanges 58. Two rolling bearings 59, of the ball- or cylindrical needle-type are inserted between the ring 57 and the ball joint 34', and may possibly be replaced by a single rolling bearing 59. Two rolling bearings 60, of the ball- or tapered roller-type are inserted between the spherical ball joint 34' and the flanges 59. The hub 19'c of an inside rotating plate 19' has an internal annular bearing surface of concave and spherical shape pressing against the external spherical surface of the ball joint 34'. In the sense of rotation about the axis Oz of the rotor, the spherical ball joint 34' is subjected to frictional forces from the rotating plate 19'. It is also subjected to a frictional torque from the bearings 59 and 60. However, as the friction due to the rotating plate 19' is far greater than that due to the rolling bearings 59 and 60, the spherical ball joint 34' will have a rotational speed of almost equal to that of the rotating plate 19'. This considerably reduces mechanical wear on these two components. The difference between the rotational speeds of these two components can be cancelled out entirely using an articulated anti-torque scissors of conventional structure which can be mounted between the ball joint 34' and the rotating plate 19'. As an alternative, an elastically deformable connecting member can provide this constant-velocity coupling. This way of assembly allows the rotating plate 19' to rotate about the axis Oz of the rotor while tolerating the pivoting movements of this rotating plate 19' on the spherical ball joint 34'.

The device according to the invention, for the individual control of the pitch of the blades of a rotor with at least four blades may also comprise at least two sets of swashplates with a rotating plate mounted so that it rotates on a non-rotating plate, and which can be inclined in any direction about their centres, and at least one of these sets of swashplates of which is such that its rotating plate is connected by two pitch rods to two nondiametrically opposed blades of the rotor, and that its non-rotating plate is articulated to two operating actuators which are not diametrically opposed with respect to the axis of the rotor and which control its inclinations about a centre of pivoting fixed to the axis of the rotor.

In this so-called "fixed centre" configuration, this set of swashplates controls two blades, not in line with one another, with just two operating rams or actuators acting on its non-rotating plate, and situated at the same distance R from the axis of the rotor, these two rams occupying any relative positions except for positions diametrically opposed with respect to the axis of the rotor.

The mathematical analysis given below shows that with such a set of swashplates with a centre of pivoting fixed to the axis of the rotor and controlled by two nondiametrically opposed rams, it is possible to give two blades of the rotor any arbitrary movement when these blades are not in line with one another. In practice, for the centre of the set of swashplates to pass through a point fixed to the axis of the rotor and constituting the centre of pivoting of this set, all that is required is for the position of the central spherical ball joint of this set of swashplates to be fixed axially, for example by fixing this ball joint to the rotor mast or to a stationary sleeve surrounding the latter, in the case of a device with full authority.

Let us assume a set of swashplates controlled by two rams situated at the distance R from the axis of the rotor and at the azimuths $\Psi_1$ and $\Psi_2$. In the aforementioned absolute reference from OXYZ associated with the stationary structure, the equation of the plane of the set of swashplates is given by:

$$aX+bY+Z=d.$$

The centre of the plates is stationary, and this dictates the value of d. As the two rams are situated at the azimuths $\Psi_1$ and $\Psi_2$, the relationship linking the heights $h_1$ and $h_2$ of the two rams to the coefficients of the equation of the plane of the plates can be written:

$$\begin{pmatrix} h_1 - d \\ h_2 - d \end{pmatrix} = \begin{pmatrix} -R\cos\Psi_1 & -R\sin\Psi_1 \\ -R\cos\Psi_2 & -R\sin\Psi_2 \end{pmatrix} \begin{pmatrix} a \\ b \end{pmatrix} \quad \text{(D-1)}$$

It is assumed that the rotating plate of this set controls two blades of the rotor using two pitch rods, the roots of which are at the azimuths $\Phi_1$ and $\Phi_2$, dependent on time. The relationship linking the heights $H_1$ and $H_2$ of the roots of the rods to the coefficients for the plane of the swashplates is given by D-2:

$$\begin{pmatrix} H_1 - d \\ H_2 - d \end{pmatrix} = \begin{pmatrix} -r\cos\Phi_1 & -r\sin\Phi_1 \\ -r\cos\Phi_2 & -r\sin\Phi_2 \end{pmatrix} \begin{pmatrix} a \\ b \end{pmatrix} \quad \text{(D-2)}$$

where r is the radius of the rotating plate at the roots of the rods.

The two blades can be given any pitch when the matrices of systems D-1 and D-2 are invertible. The respective determinants D1 and D2 of the systems D-1 and D-2 are given by:

$$D_1 = -R^2\sin(\Psi_1-\Psi_2)$$

$$D_2 = -r^2\sin(\Phi_1-\Phi_2)$$

The conditions for existence are therefore:

1. $\Psi_2 \neq \Psi_1$ and $\Psi_2 \neq \Psi_1+\pi$

2. $\Phi_2 \neq \Phi_1$ and $\Phi_2 \neq \Phi_1+\pi$

It will be seen that the difference $\Phi_1-\Phi_2$ is not dependent on time. A set of fixed-centre swashplates could control two blades by giving them independent angles of incidence when these two blades are neither coincident, which is obvious, nor in line with one another. Likewise, the control rams need not be situated symmetrically with respect to the axis of the rotor.

FIGS. 10 to 12 diagrammatically depict three examples of devices with two sets of fixed-centre swashplates for the individual control of the pitch of the blades of a four-bladed helicopter rotor.

For such a four-bladed rotor, two neighbouring blades, 90° from one another, are controlled by one of the two sets of swashplates, and the other two blades are controlled by the other set.

The individual pitch control device of FIG. 10 comprises two sets of swashplates 66 and 67, offset axially from one another, and each diagrammatically depicted in the form of plane or plate, each set 66 or 67 controlling two neighbouring blades 90° apart. Each lower set 66 or upper set 67 of swashplates can pivot or be inclined in any direction about its centre situated on the axis of the rotor mast 10 by a central spherical ball joint the centre of which is fixed to the axis of the mast 10. However, unlike in the previous examples, this ball joint cannot be translated parallel to the axis of the mast 10. Each set 66 or 67 comprises two annular plates surrounding the mast 10, and on of which is a lower rotating plate 68 or upper rotating plate 69 mounted to rotate, for example via a ballbearing, on the inside of a lower 70 or an upper 71 non-rotating plate. Each of the two rotating plates 69 and 69, the latter being holed, comprises a rim 68a or 69a connected by two spokes 68b or 69b to a hub 68c or 69c mounted on one of two central ball joints 84 fixed to the rotor mast 10. Two pitch rods 72 and 73 of two neighbouring blades of the rotor are articulated to the lower rotating plate 68, and the two pitch rods 74 and 75 of the other two neighbouring blades are articulated to the upper rotating plate 69.

As the diameter of the lower rotating plate 68 is slightly smaller than that of the upper rotating plate 69, the rods 72 and 73 can be straight and passed through an aperture in the upper rotating plate 69, being articulated to the lower rotating plate 68 by ball joints, and likewise the rods 74 and 75 are straight and articulated to the upper rotating plate 69 by ball joints.

Each non-rotating plate 70 or 71 is articulated by ball joints 30 to two nondiametrically opposed rams 76, 77 and 78, 79, each one also articulated by a ball joint 30 to the stationary structure 31 of the helicopter.

Each non-rotating plate 70 and 71 thus rests on two of the four rams and on the corresponding central ball joint 84, which is stationary, in this configuration of a device with full authority. The rams 76, 77 and 78, 79 are each non-rotating plate 70 or 71 make an angle of about 120° with their ball joint 84. There is no favoured position of the rams on one plate over those of the other, but for better distribution of forces, it is recommended that symmetric positioning be adopted, like FIG. 10, so that two neighbouring rams 76 and 79 or 77 and 78, controlling different plates 70 and 71, make an angle of about 60° between them, about the rotor mast 10.

The aforementioned difference in diameter between the rotating plates 68 and 69 is readily compensated for by a computer controlling the rams 76 to 79 that position the two sets 66 and 67 of swashplates. However, rotating plates of the same diameter may be used, in which case, as in the previous examples, the rods 72 and 73 articulated to the lower rotating plate 68 and passing through the upper rotating plate 69 will be rods which are not straight articulated to the plate 68 by cardan joints which do not allow rotating about an axis perpendicular to this plate 68.

Each rotating plate 68 and 69 is rotated by a conventional articulated scissors 80 with two branches pivoted one on the other, and one of which is pivoted on the rotor mast 10 and the other of which is articulated to the corresponding rotating plate 68 or 69 by a simple spherical ball joint.

Likewise, each of the non-rotating plates 70 and 71 is held to the stationary structure 31 by a respective one of the two conventional anti-rotation scissors (not depicted) or possibly an anti-rotation articulated double scissors.

In FIG. 10, the way in which each inside rotating plate 68 or 69 is mounted via its hub 68c or 69c on a central ball joint 84 may be the same as is depicted in FIG. 5 described hereinabove, that is to say using a hub 68c or 69c mounted via a ring such that as 36 and a ballbearing, inserted between hub and ring, about a ball joint 84 itself mounted around a sleeve such as 35 surrounding the rotor mast 10. However, for each set of swashplates 66 or 67, of the type that has the centre of pivoting fixed to the axis of the rotor, the ball joint 84 does not slide axially along the mast 10 but is fixed to the latter, in a set axial position.

Likewise, the way in which each rotating plate 68 or 69 is mounted via its hub 68c or 69c on a ball joint 84 may be the same as depicted in FIG. 6 described hereinabove, using a ring such as 57 around a sleeve 35 surrounding the mast 10, the ball joint 84 being mounted to rotate via rolling bearings such as 59 and 60 about this ring 57, which no longer slides along the mast 10 but is fixed to this mast 10 in terms of axial position.

The device with two sets of swashplates, a lower set 66' and an upper set 67', of the fixed-centre type in FIG. 11 is an alternative form of the one in FIG. 10, and can be distinguished therefrom essentially in the fact that its two rotating plates, the lower one 68' and the upper one 69', are on the outside and each rotate about a corresponding inside or central non-rotating plate, a lower one 70' or an upper one 71' respectively.

The rods 72' and 73' of the neighbouring blades and connected to the lower rotating plate 68' are not straight and are deformed so as to pass round the outside of the set of upper plates 67', and theses rods 72' and 73' are articulated to the lower rotating plate 68' by cardan joints, preventing any rotation about an axis perpendicular to the plates 68', the other two rods 74' and 75', for the other two neighbouring blades which are not in line with one another, being straight and articulated by ball joints to the upper rotating plate 69', like in the example of FIG. 10.

The two neighbouring and nondiametrically opposed rams 76' and 77' which support the lower non-rotating plate 70', are each articulated by ball joints 30 between the stationary structure 31 and the respective one of two radial arms 56' extendng the non-rotating plate 70' underneath the lower rotating plate 68'.

The other two neighbouring and nondiametrically opposed rams 78' and 79' are each articulated by ball joints 30 between the stationary structure 31 and the upper non-rotating plate 71', in the form of an annular disc, that these rams 78' and 79' support since their rod passes through apertures 70'a and 70'b made in the lower non-rotating plate 70', also in the form of an annular disc. The upper non-rotating plate 71' is held via the lower non-rotating plate 70' by an anti-rotation double scissors 55-49, of the type depicted in FIG. 9, situated between the two non-rotating plates 70' and 71' so that it does not interfere with the path of the rods 72' and 73' during their rotation.

Each of the rotating plates 68' and 69' can be rotated without difficulty using the conventional scissors with two branches pivoting one on the other, and one of which is articulated with pivoting to the mast 10 and the other of which via a ball joint to the corresponding rotating plate 68' or 69'. Thus, the upper rotating plate 69' can be driven by a rotating scissors such as 80 in FIG. 10, but the scissors 80' that drives the lower rotating plate 68' has longer branches so that they can pass over and round the outside of the set of upper plates 67', without entering the space between the two sets of plates 66' and 67', so as not to interfere with the anti-rotation scissors 57'.

Each non-rotating plate 70' or 71', in the form of an annular disc, is mounted so that it can pivot, without the possibility of axial translation, on a central ball joint the centre of which is a point fixed to the axis of rotation of the rotor. As a preference, this ball joint is not secured directly to the mast 10 and does not rotate with it, thanks to an assembly of the type depicted in FIGS. 5 and 6, with the insertion of a ring and at least one rolling bearing, and possibly with the aid of a stationary sleeve surrounding the mast 10.

When there is no sleeve but there is a ring such as 57 in FIG. 6 fixed directly to the mast 10 and rotating with it, the ball joint may be mounted on a rolling bearing about the ring and the non-rotating plate may be articulated directly to the ball joint, with the same relative positions as those of the ball joint 34' and of the plate 19' in FIG. 6. However, if a sleeve such as 35 in FIG. 5 surrounds the mast 10, then each non-rotating plate can be articulated directly via its centre to a ball joint fixed directly around the sleeve.

FIG. 12 depicts another alternative form of device with two sets of fixed-centre swashplates, the upper set being identical to the one 67 in FIG. 10 and the lower set being more or less identical to the one 66' in FIG. 11.

Once again then we have a rotating upper plate 69 which is on the inside and holed, rotated by a conventional articulated scissors 80 connecting it to the mast 10 and driving two straight rods 74 and 75 connected to two neighbouring blades, this rotating plate 69 being mounted so as to pivot via its hub 69c on a central ball joint 84 fixed to the mast 10 without the possibility for axial translation, and the plate 69 being able to rotate on the inside of an outer and upper non-rotating plate 71 positioned in terms of inclination just by two nondiametrically opposed rams 78 and 79 each articulated by ball joints 30 between the stationary structure 31 and the plate 71.

Once again too, we have a lower and internal non-rotating plate 70', in the form of an annular disc without apertures, because there is no need for the rods of the rams 78 and 79 to pass through it, and which is mounted to pivot about a non-translatable central spherical ball joint, the centre of which is fixed to the axis of the rotor, the inclinations of the plate 70' being controlled by the two rams 76' and 77' which are not diametrically opposed, each articulated by ball joints 30 between the stationary structure 31 and the respective one of two radial arms 56' extending the non-rotating plate 70' under the corresponding lower and outer rotating plate 68'.

The rotating plate 68' is connected to the other two neighbouring blades of the rotor by the rods 72" and 73", which are not straight and are deformed so as to pass through an aperture in the holed upper rotating plate 69.

To hold each of the non-rotating plates 70' and 71, it is possible to use conventional articulated anti-rotation scissors, not depicted, which may be mounted without difficulty. To hold the lower non-rotating plate 70', it is possible to use a scissors such as 57 in FIG. 11, articulated to a third arm 56' of this plate 70' and to a fitting such as 58 of the stationary structure 31. A second anti-rotation scissors may be articulated, in the same way, directly between the upper non-rotating plate 71 and the stationary structure 31.

As there are no non-rotating parts in the space between the lower non-rotating plate 70' and the upper rotating plate 69, the lower rotating plate 68' may be rotated by a second rotating scissors 80, similar to the one which rotates the upper rotating plate 69, and articulated by a ball joint to the lower rotating plate 69' and with pivoting to that part of the mast 10 which extends between the two sets of plates 66' and 67'.

For a five-bladed rotor, the individual blade control device of FIG. 13 comprises two sets of swashplates, one of which is of the known type for three-bladed rotors for controlling three blades, and the other of which controls the other two blades of the rotor. In a five-bladed rotor, there are only two possible ways of grouping the blades together into a group of three blades, on the one hand, and a group of two blades, on the other hand. For the set of swashplates controlling the group of two blades, these two blades may be adjacent to one another, and therefore form an angle of 72° between them, or be two blades with one of the other three blades between them, and therefore form an angle of 144° between them. In both cases, since these two blades are not at 180° from one another, their individual pitch control can be provided using a set of swashplates of the fixed-centre type, as described hereinabove. With such a set of fixed-centre swashplates, it is easier to control two blades at 72° because, of the two possible configurations, this one is the one furthest away from the special configuration (blades at 180°) for which the use of a set of fixed-centre swashplates is impossible.

Three of the five blades are therefore controlled with one set of swashplates of the type used on a three-bladed rotor, the other two blades being controlled by a fixed-centre set of swashplates, so as to obtain individual pitch control of the five blades using five non-rotating rams.

In FIG. 13, the set of swashplates 86 of the type used in a three-bladed rotor, is depicted in the lower position and comprises a non-rotating plate 90 on the inside, pivoting on a central spherical ball joint 34 which, like in FIGS. 2 to 4, slides axially about a stationary sleeve 35 surrounding the rotor mast 10, the pivoting and translations of the non-rotating plate 90 being controlled by three rams 96, 97 and 98, each articulated by ball joints 30 between the stationary structure 31 of the helicopter and the plate 90, which is held by a conventional anti-rotation scissors 99 articulated with pivoting to the stationary structure 31 and by a ball joint to the plate 90.

The conventional set of swashplates 86 also comprises a rotating plate 88 on the outside, rotating about the non-rotating plate 90 and articulated by cardan joints to the foot of three pitch rods 92, 93 and 94 which are connected to three of the five rotor blades and are not straight so that they can pas around the outside of the upper set 87 described hereinbelow, and the rotating plate 88 is rotated by a conventional driving scissors 95, articulated by ball joints to the rotating plate 88 and articulated with pivoting to the mast 10.

The other two blades are controlled by a fixed-centre set of upper swashplates 87, comprising a non-rotating plate 91 on the inside, pivoting about a central spherical ball joint 84 fixed rigidly around the sleeve 35, so that the non-rotating plate 91 can be inclined about a centre of pivoting fixed to the axis of rotation of the rotor and corresponding to the geometric centre of the stationary ball joint 84. The pivoting of the non-rotating plate 91 is controlled by two rams 100 and 101, each articulated by ball joints 30 between the stationary structure 31 and the plate 91, and the rods of which pass through apertures made in the lower non-rotating plate 90. The upper non-rotating plate 91 is held against any rotation by a conventional anti-rotation scissors 102 articulated to the non-rotating plate and to the stationary sleeve 35.

The set of upper swashplates 87 also comprises a rotating plate 89 on the outside, rotating about the non-rotating plate 91 with the aid of at least one rolling bearing, and to which there are articulated two pitch rods 103 and 104 connected to the other two blades, for example neighbouring blades, of the rotor, and the rotating plate 89 is rotated by a conventional scissors 105 articulated by a ball joint to the plate 89 and articulated with pivoting to the mast 10.

The lower 86 and the upper 87 sets of plates are controlled independently of one another by different rams, the set 86 being able to pivot about the mast 10 and sliding along the latter, while the set 87 pivots but does not slide.

To control the pitch of the blades of a seven-bladed rotor, a third set of swashplates is added, this set also being of the fixed-centre type and similar to the set 87. This third set also comprises a rotating plate which drives two pitch rods of two blades which are not in line with one another, and rotates on a non-rotating plate which cannot be translated but can be inclined on a central ball joint the centre of which is fixed to the axis of the rotor, under the action of two nondiametrically opposed control rams, and the rods of which pass through the non-rotating plates of the other two sets, if a configuration in which the non-rotating plates are on the inside is adopted for all three sets of swashplates.

In general, it is not vital for the fixed-centre set or sets of swashplates to be placed above the conventional set of swashplates, and the order in which these sets are arranged one above the other is the result of bulk and robustness considerations.

For a six-bladed rotor, the device of the invention comprises two conventional sets of swashplates, such as those used in a three-bladed rotor, and each of the two sets controls a respective three of the six rotor blades. These six blades can be grouped together into two groups of three blades in just three different ways, the blades of one and the same group forming angles of 60°, 120° or 180° between them. However, irrespective of the angle between two blades, individual control of the six blades can be provided by a device according to FIG. 14, with two conventional sets of swashplates.

The two sets of swashplates, the lower one 106 and the upper one 107, of FIG. 14 are structurally very similar and functionally identical because each of them comprises a rotating plate 108 or 109 on the outside, rotating about a non-rotating plate 110 or 111 on the inside, pivoting on a central spherical ball joint 34 which slides axially about a stationary sleeve 35 surrounding the rotor mast 10.

The inclinations and translations of each set 106 or 107 are controlled by three rams 112, 113, and 114 each articulated by ball joints between the stationary structure 31 and the non-rotating plate 110 of the lower set 106 and by three rams 115, 116, and 117, each articulated by ball joints between the stationary structure 31 and the non-rotating plate 111 of the upper set 107, and the rods of which pass through the non-rotating plate 110.

The non-rotating plate 110 is held by a conventional anti-rotation scissors 118 articulated between the plate 110 and the stationary structure 31, and the other non-rotating plate 111 is held by an anti-rotation scissors 119, also conventional, articulated by a ball joint to the plate 111 and with pivoting to the stationary sleeve 35.

The rotating plate 108 is articulated by cardan joints to the foot of three non-straight pitch rods 120, 121 and 122, and the rotating plate 109 is articulated by ball joints to the foot of three straight pitch rods 123, 124 and 125. Each of the rotating plates 108 and 109 is rotated by a respective one of two conventional articulated scissors 126 and 127, to the lower rotating plate 108.

For the individual pitch control of the blades of an eight-bladed rotor, the device of FIG. 14 is supplement by a third set of swashplates identical to the upper set 87 in FIG. 13, and of the fixed-centre type, for controlling two blades which are not in line with one another under the action of two nondiametrically opposed rams, the rods of which may pass through the two internal non-rotating plates 110 and 111 of the two sets 106 and 107, each controlling respective three of the other six rotor blades.

For a nine-bladed rotor, the device of FIG. 14 is supplement by a third conventional set of swashplates, of the type of the sets 106 and 107.

In general, if the number b of rotor blades is a multiple of 3 n of 3 (where n is a whole number at least equal to 2), the device comprises n conventional sets of swashplates such as 106 or 107 of FIG. 14, which are mounted axially offset along the mast 10 and the sleeve 35 which surrounds it.

If the number b of blades is equal to 3 n+1, where n is a whole number greater than or equal to 1, the device comprises a number (n–1) of conventional sets of swashplates such as 86 in FIG. 13, or 106 or 107 in FIG. 14, together with two sets of swashplates of the fixed-centre type, such as the set 87 of FIG. 13, these last two sets each controlling two blades no in line with one another and each being controlled by two nondiametrically opposed rams.

Finally, if the number b of blades are equal to 3 n+2, where n is a whole number greater than or equal to 1, the device comprises a number n of conventional sets of swashplates such as 86 in FIG. 13 or 106 or 107 in FIG. 14, and a single fixed-centre set of swashplates, such as 87 in FIG. 13.

The way in which the pitch rods for the blades are distributed between the rotating plates of the various sets depend son the bulk of the various parts of the device, and in particular of the driving scissors and the radii of the rotating plates.

All the devices described hereinabove are devices with full authority, for which all the actuators for operating the various sets of swashplates rest on the stationary structure of the helicopter, to which they are articulated.

For safety reasons, it may be envisaged for not all of the responsibility for setting the angle of incidence of the rotor blades to be confided in an individual pitch control device with full authority, like the one described hereinabove. Indeed, by its very design, such a device is capable of giving the blades independent and disordered movement should there be a breakdown or a disturbance in its control. Furthermore, such a device has to be computer-controlled, and the functions which convert a desired angle of incidence of a blade into the displacement of the corresponding operating actuator are complex and depend on time through the azimuth position of the blades. For these reasons, a breakdown may have disastrous consequences on the individual control of pitch with full authority.

In order to improve safety, all these devices can be produced in a reduced-authority version, providing a conventional monocyclic control law in the event of a breakdown in the individual blade control, thanks to an improvement which consists in articulating all the operating actuators not to the stationary structure of the helicopter, but to an additional plate, known as a safety plate, which does not rotate and is mounted so that it can be translated and inclined about its centre situated on the axis of the rotor by appropriate control means, especially by three safety actuators inserted between the safety plate and the helicopter structure, on which these safety actuators rest and to which they are articulated.

In a device with reduced authority, whit the safety plate and its aforementioned control means, the first harmonic of the cyclic pitch is imposed by mechanical means which are not highly stressed because they work in quasistatic mode (the inclinable and translatable safety plate and its control means), and the individual control of each blade, provided by the corresponding operating actuator can take effect with a limited amplitude but with operation in dynamic mode in order to modulate a monocyclic pitch already established by the safety plate. The distribution of the components in the control law is favourable to the reliability of the device.

Such a device with reduced authority is depicted in FIG. 16, applied, by way of example, to a device with two sets of swashplates of the fixed-centre type, but it is obvious that it can be applied to all the devices described earlier, comprising at least two sets of swashplates of the type for blades at 180° or of the fixed-centre type and/or of the conventional type for a three-bladed rotor.

In FIG. 16, we substantially again have an individual control device according to FIG. 10, with two sets of swashplates, a lower set 66 and an upper set 67, each comprising a rotating plate on the inside 68 or 69 pivoting on a spherical central ball joint 84' mounted about the rotor mast 10, materialized by the axis of the rotor, so that the centre of the ball joint 84' lies on the axis of the rotor. Each rotating plate 68 or 69 is articulated to two pitch rods 72, 73 or 74, 75 respectively of two neighbouring blades not in line with one another, of the four-bladed rotor, and each rotating plate 68 or 69 is rotated by a scissors, not depicted, such as 80 in FIG. 10. Each rotating plate 68 or 69 can rotate inside a corresponding non-rotating plate 70 or 71 with the corresponding rotating plate 68 or 69 about the corresponding ball joint 84' are controlled by two nondiametrically opposed rams 76, 77 or 78, 79 respectively which do not control the axial translation of the plates 70 and 71.

All the rams 76 to 79 are each articulated by ball joints on the one hand, to the corresponding non-rotating plate 70 or 71, and on the other hand, to a safety plate 128 which is inserted between the stationary structure 31 of the helicopter and the sets of swashplates 66 and 67 of the device.

The plate 128 is a non-rotating plate, held to the stationary structure 31 by a conventional anti-rotation scissors 129 articulated by a ball joint to the plate 128 and with pivoting to the structure 31, and the plate 128 can be inclined in any direction about its centre which lies on the axis of the rotor and can be translated parallel to this axis as it is mounted so that it can pivot on a central spherical ball joint 130 mounted to slide axially about the rotor mast 10, in any appropriate way.

The pivoting of the plate 128 about is centre and the translations of the plate 128 along the rotor mast 10 are controlled by any appropriate means which may be a mechanical positioning system controlled by the pilot or three safety actuators such as rams 131, 132, 133, each articulated by ball joints to the stationary structure 31 and the underside of the safety plate 128.

So that the movements of the plate 128 along the mast 10, controlling the overall pitch, can be transmitted by the rams 76 to 79 to the swashplates of the sets 66 to 67, their central ball joint 84' needs also to be able to move axially, and cannot be a ball joint fixed to the mast 10 like the ball joints 84 of the device of FIG. 10, according to a structure depicted diagrammatically in FIG. 15. In FIG. 15, we again have the two rotating plates, the lower one 68 and the upper one 69, of a device with full authority and with two fixed-centre sets of swashplates, in which each rotating plate 68 or 69 is on the inside and mounted to pivot by its hub 68c or 69c on a ball joint 84 secured to the rotor mast 10.

In its reduced-authority configuration, a device with at least one fixed-centre set of swashplates needs to be modified so that the central ball joint of each fixed-centre set is secured in terms of axial translation to the safety plate 128.

FIG. 17 depicts the central part, thus modified, of a device with two fixed-centred sets and reduced authority which may be the one depicted diagrammatically in FIG. 16. In FIG. 17, we again see the non-rotating safety plate 128 which pivots on the central ball joint 130 secured to the lower axial end of a sleeve 135 surrounding the mast 10 and mounted to slide axially along the latter via anti-friction rings 134. The internal plates of the lower set 66 and upper set 67 of swashplates can each pivot on the central ball joint 84', also secured to the sleeve 135. If the internal plates of the sets 66 and 67 are non-rotating plates, as in FIG. 11, each of these non-rotating plates can be articulated directly via its hub to the corresponding ball joint 84', because these plates, these ball joints and the sleeve 135 do not rotate. By contrast, if these internal plates are rotating plates, like the plates 68 and 69 in FIG. 10 or FIG. 16, it is preferable to use an assembly similar to those of FIGS. 5 and 6, with a ring and rolling bearing inserted either between the ball joint 84' and each rotating plate 68 or 69 or between the ball joint 84' and the sleeve 135 which supports it in an axial position defined on it.

In the case of the reduced-authority device of FIG. 17, it will be understood that each fixed-centre set of swashplates has the centre of its ball joint 84' no longer fixed in an axial position on the mast 10, but fixed to the sliding sleeve 135.

In the case of a reduced-authority device with two sets of swashplates for blades at 180° or at least one conventional set of swashplates, of the type for a three-bladed rotor, it is known that the central ball joints of said sets can slide along the rotor mast 10, preferably with assemblies according to FIGS. 5 and 6, in which the ball joints 34 and 34' already slide about a sleeve 35 surrounding the rotor mast 10. In this case, all that is needed is for the central ball joint 130 of the safety plate 128 also to be mounted to slide axially about the stationary sleeve 35, or alternatively for the ball joint 130 to be fixed to the lower part of the sleeve 35 mounted to slide freely along the mast 10, and no longer fixed to the helicopter structure.

For the sets of swashplates, such as 66 and 67 in FIGS. 16 and 17, which provide individual blade control, the neutral position of the operating rams 76 to 79 needs to correspond to a position in which the plates, such as 68, 69, 70 and 71 of these sets, are parallel to the safety plate 128.

Assuming that all the operating rams 76 to 79 are in the neutral position, the rotor is controlled only by the mechanical device comprising the safety plate 128 and its actuators 131 to 133. The safety plate 128 must have the same effect on all the blades, and this is indeed the case as far as the overall pitch is concerned, because a movement of the safety plate 128 parallel to the rotor axis brings about the same movement on the plates of the various sets of swashplates mounted about the mast 10, between the safety plate 128 and the rotor blades. The same movement is indeed obtained for all the pitch rods such as 72 to 75, and the same variation in pitch of the blades is achieved if the pitch control lever arms are the same length for all the blades, something which generally is the case for reasons of the dynamic balancing of the rotor.

By contrast, the same is not true of cyclic pitch control, which corresponds to an inclination of the safety plate 128, but the effect of a variation in inclination of the safety plate 128 on the pitch of each blade depends on the radius of the rotating plate to which the pitch rod for this blade is articulated.

In order that a certain inclination of the safety plate 128 should produce the same effect on the pitch of all the rotor blades, it is therefore advantageous for the rotating plates of the various sets of swashplates to have the same radius.

When the rotating plates have different radii, compensation may be provided by giving the sets of swashplates different inclinations, using, for example, a mechanism with an articulated lever.

FIG. 18 depicts an example of a mechanism for compensating for the different radii of the rotating plates in the case of a reduced-authority device with two fixed-centre sets of swashplates, as depicted in FIG. 16, and the ball joints of which are secured to a sleeve which slides axially, as depicted in FIG. 17. It is assumed that the radius of the rotating plate 68 of the lower set of swashplates 66 is half the radius of the rotating plate 69 of the upper set of swashplates 67. The short radius of the rotating plate 68 is compensated for by inclining the lower set 66 of the two plates 68 and 70 by an angle 2 α, which is twice the angle α of inclination of the two plates, the rotating one 69 and the non-rotating one 71, of the upper set 67, and which is transmitted to these plates 69 and 71 from the safety plate 128 which is also inclined by an angle α, by the corresponding rams 78 and 79, blocked in the neutral position, and just one of which is depicted in FIG. 18. The double inclination 2 α is obtained, for each of the two rams 76', 77' that operate the lower set of plates 66, just one of which is depicted in FIG. 18, and which correspond to the rams 76 and 77 in FIG. 16, using a lever 136 articulated about a fixed point 137 at the end of a radial arm 138 secured to the sleeve 135 sliding axially about the mast 10, and which is the sleeve to which the central ball joints 84' about which the swashplates of the lower set 66 and upper set 67 pivot and the central ball joint 130 about which the safety plate 128 pivots are secured. In FIG. 18, the distance between the point of articulation 137 of the lever 136 and the rotor axis is equal to one third of the distance between this axis and the corresponding ram 76' or 77'. The rams 76' and 77', like the rams 78 and 79, are articulated to the safety plate 128, because this is a reduced-authority device. The lever 136, at its opposite end to the end which is articulated to the ram 76' or 77', is articulated to an arm 139, itself articulated to the non-rotating plate 70 of the lower set 66 at a point 140 which lies the same distance from the rotor axis as the ram 76' or 77', but on the diametrically opposite side, so that the plates 68 and 70 of the lower set 66 are inclined by twice as much as the safety plate 128.

A movement of the safety plate 128 parallel to the rotor axis does not alter the inclination of the sets of plates 66 and 67, and therefore does not alter the cyclic pitch, only the overall pitch, and in the same way for all the blades. In the device of FIG. 18, should the rams 76', 77' and 78, 79 that operate the sets of plates 66 and 67 break down, when these rams are blocked in the neutral position, the system reverts to the configuration of conventional monocyclic control, even though the rotating plates 68 and 69 have different diameters.

However, it is necessary to lock the swashplate operating rams in the neutral position, which corresponds to the swashplates 68, 70 and 69, 71 being horizontal, that is to say perpendicular to the axis of the rotor, when the safety plate 128 is itself perpendicular to this axis, and therefore horizontal.

The operating rams, such as 76, 77, 78 and 79 in FIG. 16, which provide individual control of the blades, are hydraulic rams which can be fed without difficulty, because they are mounted in a non-rotating reference frame, from a hydraulic unit of the helicopter supplying a high pressure. In order that the bursting of a hydraulic line or the breakdown of the hydraulic unit feeding the operating rams should not endanger the safety of the helicopter, a system that can lock the individual control of the blades in the neutral position is provided.

This locking system may be coupled to the hydraulic control of the operating rams as follows: if the hydraulic pressure in the circuit feeding these rams drops below a certain threshold, the computer that controls these rams, which are electro-hydraulic servo control rams, makes use of the residual hydraulic pressure to return the rams to the neutral position, using an emergency procedure, following which the rams are locked in this neutral position.

Should the loss of hydraulic pressure be too sudden, so that the aforementioned emergency procedure proves insufficient to return the rams to the neutral position, a hydromechanical device arrange on each operating ram allows this ram to be returned gradually to the neutral position and locked in this position. This hydromechanical locking device takes the energy it needs to operate from the movements of the safety plate 128 and from random variations, due to turbulence of aerodynamic origin, in the pitch of the blades the pitch rods of which are connected to the set of swashplates controlled by the corresponding operating ram.

FIG. 19 diagrammatically depicts an operating ram equipped with one example of such a hydromechanical device for locking this ram in the neutral position.

Depicted diagrammatically in FIG. 19 is one of the operating rams, such as 76, of the device of FIG. 16. This ram 76 comprises a cylinder 141 and a rod 142 secured to a piston sliding in the cylinder 141, and whose movements within the latter are controlled by letting hydraulic oil under high pressure in on one or other side of the piston, and returning hydraulic oil from the opposite side of the piston to a reservoir, along a supply line 143 and a return line 144 respectively, so as to control the relative axial movements of the rod 142 and of the cylinder 141, one of which is articulated to the safety plate 128, and the other of which is articulated to the non-rotating plate such as 70, in the direction for increasing or decreasing the distance separating the two ball joints at which the ends of the ram 76 are articulated. The locking device comprises two small locking rams 145 and 146 secured to the cylinder 141. Each locking ram 145 or 146 comprises a cylinder 147 fed by a passage 148 connected to the same pressure source as the ram 76, and therefore fed with oil at high pressure which enters the cylinder 141. The pressure tapping for the passages 148, may be in the cylinder 141 or at the inlet to the feedline 143 into this cylinder. The hydraulic pressure let into the cylinder 147 by the passage 148 is exerted on a piston 149 mounted to slide in the cylinder 147, and against the action of a return spring 150 also housed in the cylinder 147. Each piston 149 is secured to a rod 151 passing through the cylinder has a locking tooth 152 or 153, each interacting with a respective one of two locking racks 154 and 155 machined on the opposite sides of part of the rod 142 and axially offset from one another along this part of the rod 142. Each rack 154 and 155 has teeth of triangular section, one side of which is arrange as a ramp inclined with respect to the axial direction of the rod 142, and the other side of which is a stop perpendicular to this direction, and each rack 154 or 155 interacts with a complementary-shaped tooth 152 or 153 to allow the rod 142 to move in just a respective one of the two directions of operation, and to block movement in the opposite direction.

In FIG. 19, interaction of the tooth 153 of the upper locking ram 146 with the upper locking rack 155 prevents the rod 142 from moving from right to left, but allows this movement from left to right because of the cooperation of the teeth of the rack 155 which push the tooth 153 towards the inside of the cylinder 147, against the spring 150, while the tooth 152 of the lower locking ram 145 and the lower locking rack 154 are arranged in such a way as to allow the rod 142 to move from right to left and so as to block the rod 142 in its movements from left to right. In addition, the axial offset between the racks 154 and 155 allows, in the case of each of them, maximum movement of the rod 142 in the direction allowed by this rack as far as a neutral point defined by the adjacent ends of the racks 154 and 155, which correspond to one another and overlap by the length of one tooth.

When the feed pressure of the ram 76 is high, as this pressure is let into the cylinders 147 via the passages 148, the pistons 149 compress the springs 150 and the teeth 152 and 153 are moved away from the rod 142 and the racks 154 and 155. When the pressure entering the ram 76 drops, the springs 150 push back the pistons 149, and the teeth 152 and 153 come into contact with the rod 142, so that one of them, opposite a rack 154 or 155, engages between two teeth of this rack.

When the point "O" of the graduation borne by the rod 142 comes level with the two teeth 152 and 153, the rod 142 and the piston in the cylinder 141 of the ram 76 are in the neutral position. In FIG. 19, the ram 76 is depicted in a position in which its rod 142 is driven into the cylinder 141, therefore moved to the left with respect to the neutral position. The drop in feed pressure to the ram 76 causes the tooth 153 to engage in the rack 155 under the thrust from the spring 150. The rod 142 can no longer move any further to the left in FIG. 19, but is, however, free to move to the right, until the other tooth 152 of the locking ram 145 becomes active in turn, engaging in the rack 154. This occurs when the rod 142 reaches the neutral position, in which it remains thereafter blocked.

If, initially, the rod 142 was deployed out of the cylinder 141, and therefore moved to the right in FIG. 19, when the feed breakdown occurred, the tooth 153 is inactive because it is not opposite its rack 155, and the tooth 152 on the other hand is engaged between two teeth of the rack 154, which means that the rod 142 can move only to the left. This movement to the left will occur until the tooth 153 becomes active, which will happen as soon as the rod 142 reaches the neutral position, in which the tooth 153 will engage in the end of the rack 155 situated to the left in FIG. 19.

Thus, in the event of a breakdown in the pressurized hydraulic supply, any tensile or compressive force exerted on the rod 142 of the ram 76 tends gradually to return this rod 142 to the neutral position, in which the ram 76 remains thereafter locked.

In this assembly, the locking rams 145 and 146 can be considered as simple devices for measuring the hydraulic pressure at the inlet to the ram 76. These locking rams 145 and 146 may also be given the task of operating an electrical contact, via their moving gear 148–150–151 or 152, if the hydraulic pressure drops below a critical threshold. If the electrical contact is connected to the computer that controls the ram 76, then the emergency procedure mentioned hereinabove may be triggered.

All the multiple-swashplates devices described hereinabove allow the blades to be controlled using conventional rams, mounted in the non-rotating reference frame, and of which there are as many as there are rotor blades.

With two sets of swashplates it is possible to provide individual control of the blades of four-bladed, five-bladed or six-bladed helicopter main rotors, that is to say the rotors of the vast majority of helicopters currently in service.

What is more, in the event of a breakdown in the hydraulic circuit feeding the individual pitch control rams, these rams can be gradually brought back to the neutral position and locked in this position with the aid of a simple hydromechanical device such as the one in FIG. 19, which means that the control device reverts to a conventional monocyclic control configuration.

The multiple-swashplate devices employ connecting means which lie between the rotating or non-rotating plates (including possibly the safety plate) and respectively the rotor axis or a non-rotating or stationary structure.

An embodiment of a double scissors applied to a device with two sets of swashplates is depicted in FIG. 9. This double scissors can be readily adapted to suit multiple-plate applications. Each additional plate is then fitted with a spider 53' articulated, on the one hand, to the plate and, on the other hand, to a scissors 49, the other end of which is articulated to the spider of the neighbouring swashplate. The function of the scissors, that is to say the transmission of elevation between two moving structures one with respect to the other is thus achieved, irrespective of the angle of inclination of each plate concerned.

All the control devices described, both in the full-authority configuration and in the reduced-authority configuration, can be produced using conventional means using, in the case of the swashplates, proven technology, in the case of the operating rams with a high enough control frequency, technology which is sufficiently well developed.

What is claimed is:

1. Device for individually controlling all blades of a rotor having a least four blades on a same plane for a rotary wing structure of an aircraft, comprising:

a first set of swashplates comprising
 a first rotating plate having a centre of rotation on an axis of rotation of the rotor, and
 a first non-rotating plate on which said first rotating plate rotates and having a center of pivoting on the axis of rotation of the rotor coincident with a centre of rotation of the first rotating plate and defining a centre of said first set of swashplates, at least two first operating actuators by which said first set is inclinable in all directions about the center thereof, said first actuators being inserted between a non-rotating structure of the aircraft and said first set, each said first actuator being articulated to the first non-rotating plate, and being held by a connecting means to said non-rotating structure, a connection between the first rotating plate and the rotor about the axis of the rotor by which the first rotating plate is rotated, respective first pitch rods by which the first rotating plate is connected to each of at least two first blades of the rotor, at least a second set of swashplates having a centre also lying on the axis of the rotor, at least one second operating actuator by which said second set is inclinable in all directions about a centre thereof and which is inserted between the non-rotating structure and said second set, wherein said second set includes a second non-rotating plate which is articulated to said second actuator and which is held by a connecting means to the non-rotating structure, while a second rotating plate of said second set is also rotated by a connection to the rotor about the axis of the rotor, and is connected to each of at least two second blades of the rotor by respective second pitchrods, wherein there are as many said first and second operating actuators and other operating actuators as the rotor has blades, and all of the operating actuators are non-rotating, and wherein the first and second rotating plates are each connected to a maximum of three blades by respective first and second pitch rods.

2. Device according to claim 1;

wherein the rotor has four blades, and in which the blades are grouped in first and second pairs of first and second blades which diametrically opposed with respect to the axis of the rotor, wherein the first pitch rods of the first diametrically opposed blades are articulated to the first rotating plate of the first set of swashplates, the centre of said first set can be translated along the axis of the rotor, and the first non-rotating plate of said first set is articulated to three first operating actuators controlling the translations and inclinations of said first set of swashplates, wherein the second pitch rods of the second pair of diametrically opposed second blades are articulated to the second rotating plate of the second set of swashplates, the centre of said second set is axially offset with respect to that of the first set of swashplates and can be translated along the axis of the rotor, and the second non-rotating plate of said second set is articulated to the second operating actuator and connected to the first non-rotating plate of the first set of swashplates by two rigid bars of constant length, each said rigid bar transmitting to the second non-rotating plate of said second set the movement transmitted to the first non-rotating plate of said first set by each associated first actuators articulated to the first non-rotating plate.

3. Device according to claim 2, wherein the two rigid bars constitute connecting means which oppose the rotation of the second non-rotating plate of the second set of swashplates.

4. Device according to claim 1;

wherein the rotor has four blades.

wherein, to each respective first and second rotating plate of the first and second sets of swashplates, there are articulated respectively two first and second pitch rods of two respective nondiametrically opposed blades, wherein each respective first and second non-rotating plate of the respective first and second sets of swashplates is articulated to two respective non diametrically opposed operating actuators controlling only the inclinations of the corresponding non-rotating plates about the corresponding centre of pivoting, and wherein the centres of the first and second sets of swashplates are not translatable along the axis with respect to the non-rotating structure.

5. Device according to claim 1;

wherein the rotor has a number b of blades equal to 3n+1, where n is a whole number greater than or equal to 1; and wherein said device further comprises:

a number (n−1) of primary sets of said swashplates,
  wherein each centre of said primary sets can be translated along the axis of the rotor,
  wherein the associated primary rotating plate of each of said primary sets is articulated to three associated primary pitch rods for the blades, and
  wherein the associated primary non-rotating plate of each of said primary sets is articulated to and moved by three associated primary operating actuators, and two secondary sets of swashplates,
  wherein the secondary rotating plate of each of said secondary sets is articulated to two associated secondary pitch rods for two nondiametrically opposed blades, and
  wherein the secondary non-rotating plate of each of said secondary sets is articulated to two associated secondary nondiametrically opposed operating actuators controlling only the inclinations of the corresponding secondary non-rotating plate about the corresponding centre of pivoting.

6. Device according claim 1;

wherein the rotor has a number b of blades is equal to 3n+2, where n is a whole number greater than or equal to 1; and wherein said device further comprises:

a number n of primary sets of swashplates,
  wherein each centre of said primary set can be translated along the axis of the rotor, and
  wherein the primary rotating plate of each said primary sets is articulated to three associated primary pitch rods for the blades, and the primary non-rotating plate of each of said primary sets is articulated to and moved by three associated primary operating actuators, and a secondary set of swashplates,
  wherein the secondary rotating plate said second sets is articulated to two associated secondary pitch rods for two nondiametrically opposed blades, and
  wherein the secondary non-rotating plate of said second sets is articulated to two associated nondiametrically opposed secondary operating actuators controlling only the inclinations of said secondary set about the corresponding centre of pivoting.

7. Device according to claim 1;

wherein the rotor has a number b of blades is a multiple 3n of 3, n being a whole number greater than or equal to 2; and wherein said device further comprises:

a number n of primary sets of swashplates,
  wherein each centre of said primary sets can be translated along the axis of the rotor, and
  wherein the primary rotating plate of each of said primary sets is articulated to three associated primary pitch rods for the blades, and the primary non-rotating plate of each of said primary sets is articulated to and moved by three associated primary operating actuators.

8. Device according to claim 1;

wherein each said operating actuator is also articulated to a non-rotating safety plate inserted between the sets of swashplates and the stationary structure of the aircraft, the safety plate being connected by anti-rotation means to the stationary structure, the safety plate being translatable along the axis of the rotor and inclinable in all directions about a centre thereof under the action of position-control means inserted between the safety plate and the stationary structure, and wherein said device further comprises three safety actuators, each articulated to the safety plate, and to said stationary structure.

9. Device according to claim 8, additionally comprising means for locking the individual pitch control for each blade, said locking means being borne by said operating actuators, and allowing monocyclic control of the blades by controlling the translations and inclinations of the safety plate.

10. Device according to claim 9, wherein the locking means comprise, for each operating actuator, a locking device for locking said operating actuator in a neutral position.

11. Device according to claim 10, wherein each said locking device comprises two racks, each of which is intended to block the corresponding operating actuator in one respectively of the two directions in which said actuator can be operated.

12. Device according to claim 8, wherein the rotor includes a rotor mast, and wherein the safety plate can be inclined on a central ball joint mounted so that said ball joint can slide axially about the rotor mast or about a sleeve surrounding the rotor mast.

13. Device according to claim 12, such that at least one of the sets of swashplates has the non-rotating plate thereof only inclined by two corresponding operating actuators about the corresponding centre of pivoting on the axis of the rotor, wherein said centre of pivoting is defined on a sleeve mounted so that it can slide axially about the rotor mast, and bearing the central ball joint of the safety plate.

14. Device according to claim 8, wherein the rotating plates of two neighboring sets of swashplates have different diameters, and wherein at least one non-rotating mechanism with articulated levers is inserted between an operating actuator of the non-rotating plate of one of the two sets and said non-rotating plate so as to give to one of the two sets an inclination which differs from that of the safety plate, so as to compensate for the difference in diameter between the rotating plates.

15. Device according to claim 14, wherein the mechanism with articulated levers is articulated to a stationary point of a sleeve sliding axially about the rotor mast.

16. Device according to claim 1, wherein the first and second rotating plates of said first and second sets of swashplates are all mounted along the axis of the rotor, such that said first and second rotating plates rotate on the inside of the respective first and second non-rotating plates, and wherein at least one said first pitch rod passes through an aperture made in said second rotating plate of the second set of swashplates which is located between the first rotating plate to which said first pitch road is articulated and the blades that said first rotating plate controls.

17. Device according to claim 1, wherein the first rotating plate of the first set of swashplates along the axis of the rotor is located between the second set of swashplates and the stationary structure of the aircraft, and is mounted so that the first rotating plate can rotated about the first non-rotating plate, whereas the second rotating plate of said second set of swashplates is mounted so that said second rotating plate can rotate on the inside of the second non-rotating plate, and wherein the first pitch rods, articulated to the first rotating plate, pass through apertures in the second rotating plate of the second set.

18. Device according to claim 1, wherein the first and second rotating plates of the first and second sets of swashplates are all mounted along the axis of the rotor, such that the respective first and second rotating plates rotate on an outside of the respective first and second non-rotating plates, and wherein at least one second actuator passes through an aperture made in the first non-rotating plate of the first set of swashplates which is located between the second non-rotating plate to which said actuator is articulated and the non-rotating structure.

19. Device according to claim 1, wherein at last one of the first and second pitch rods is not straight and is articulated to the corresponding first and second rotating plate by articulation means which prevent said one of the first and second pitch rods from rotating about an axis perpendicular to said corresponding first and second rotating plate.

20. Device according claim 1, wherein the first and second sets of swashplates are located along the axis of the rotor have one of their respective first and second non-rotating plates connected to one another and to the stationary structure of the aircraft by at least one anti-rotation articulated double scissors and their respective first and second rotating plates connected to one another and to the rotor by at least one rotational-drive articulated double scissors.

* * * * *